United States Patent
Zamudio Rivera et al.

(10) Patent No.: US 8,722,588 B2
(45) Date of Patent: May 13, 2014

(54) FOAMING COMPOSITION FOR HIGH TEMPERATURE AND SALINITY

(75) Inventors: Luis Silvestre Zamudio Rivera, Mexico City (MX); Simón López Ramírez, Mexico City (MX); Cecilia de los Ángeles Durán Valencia, Mexico City (MX); Raül Hernández Altamirano, Mexico City (MX); Violeta Yasmín Mena Cervantes, Mexico City (MX); Norma Araceli García Muñoz, Mexico City (MX); Alfredo Ríos Reyes, Mexico City (MX); Alejandro Ortega Rodríguez, Mexico City (MX); JoséLuis Mendoza De La Cruz, Mexico City (MX); Marcelo Lozada Y Cassou, Mexico City (MX); Eduardo Buenrostro González, Mexico City (MX)

(73) Assignee: Instituto Mexicano del Petroleo, Mexico City (MX)

( * ) Notice: Subject to any disclaimer, the term of this patent is extended or adjusted under 35 U.S.C. 154(b) by 220 days.

(21) Appl. No.: 13/139,199

(22) PCT Filed: Oct. 5, 2009

(86) PCT No.: PCT/MX2009/000106
§ 371 (c)(1),
(2), (4) Date: Jul. 19, 2011

(87) PCT Pub. No.: WO2010/068082
PCT Pub. Date: Jun. 17, 2010

(65) Prior Publication Data
US 2011/0275546 A1  Nov. 10, 2011

(30) Foreign Application Priority Data
Dec. 12, 2008  (MX) .................. MX/A/2008/015989

(51) Int. Cl.
*C09K 8/60* (2006.01)
*E21B 43/26* (2006.01)
*E21B 43/00* (2006.01)

(52) U.S. Cl.
USPC ......... 507/213; 507/935; 166/308.6; 166/309

(58) Field of Classification Search
USPC ................... 507/213, 935; 166/308.6, 309
See application file for complete search history.

(56) References Cited

U.S. PATENT DOCUMENTS

| 3,939,911 | A |   | 2/1976 | Maddox, Jr. et al. |
|---|---|---|---|---|
| 4,201,678 | A |   | 5/1980 | Pye et al. |
| 4,375,421 | A | * | 3/1983 | Rubin et al. .................. 510/403 |
| 4,477,365 | A | * | 10/1984 | Verboom et al. ............. 510/197 |
| 4,607,695 | A |   | 8/1986 | Weber |
| 4,703,797 | A |   | 11/1987 | Djabbarah |
| 5,049,311 | A |   | 9/1991 | Rasheed et al. |
| 5,273,682 | A |   | 12/1993 | Danzik |
| 5,295,540 | A |   | 3/1994 | Djabbarah et al. |
| 5,542,474 | A |   | 8/1996 | Djabbarah et al. |
| 5,897,699 | A |   | 4/1999 | Chatterji et al. |
| 7,104,327 | B2 |  | 9/2006 | Harris et al. |
| 2007/0142235 | A1 |  | 6/2007 | Berger et al. |

OTHER PUBLICATIONS

Hiraski et al., Surfactant Based Enhanced Oil Recovery and Foam Mobility Control, Department of Energy of the United States of America DE-FC26-03NT15406 Report, Jul. 2005.
Zhu et al., Improving the Foam Performance for Mobility Control and Improved Sweep Efficiency in Gas Flooding, Ind. Eng. Chem. Res., 2004, 43, 4413-4421.
Basheva et al., Role of Betaine as Foam Booster in the Presence of Silicone Oil Drops, Langmuir 2000, 16, 1000-1013.
Christov et al., Synergistic Sphere-to-Rod Micelle Transition in Mixed Solutions of Sodium Dodecyl Sulfate and Cocoamidopropyl Betaine, Langmuir 2004, 20, 565-571.
Jiang et al., Cornucopian Cylindrical Aggregate Morphologies from Self-Assembly of Amphiphilic Triblock Copolymer in Selective Media, J. Phys. Chem. B, 2005, 109, 21549-21555.
Jian et al., Density Functional Calculations, Synthesis, and Characterization of Two Novel Quadruple Hydrogen-Bonded Supramolecular Complexes, J. Phys. Chem. A, 2004, 108, 5258-5267.
Norrby et al., Strong Decrease of the Benzene-Ammonium Ion Interaction upon Complexation with a Carboxylate Anion, J. Am. Chem. Soc., 1999, 121, 2303-2306.
Danov et al., Mixed Solutions of Anionic and Zwitterionic Surfactant (Betaine): Surface-Tension Isotherms, Adsorption, and Relaxation Kinetics, Langmuir 2004, 20, 5445-5453.

* cited by examiner

*Primary Examiner* — Aiqun Li
(74) *Attorney, Agent, or Firm* — Roylance, Abrams, Berdo & Goodman, L.L.P.

(57)  ABSTRACT

The present invention relates to the preparation of foaming formulations for high temperature, salinity and concentration of divalent ions, such as Calcium and Magnesium, that apply the synergistic effect of sodium alpha olefin sulfonates and alkyl amido propyl betaines; said inventions may use, as solvent, water, sea water, connate water, alcohols or mixtures all thereof. Said formulations control the piping of gas in reservoirs of the naturally fractured carbonate type.

33 Claims, 31 Drawing Sheets

FOAMING COMPOSITION FOR HIGH TEMPERATURE AND SALINITY

TECHNICAL FIELD OF THE INVENTION

Figure 1:
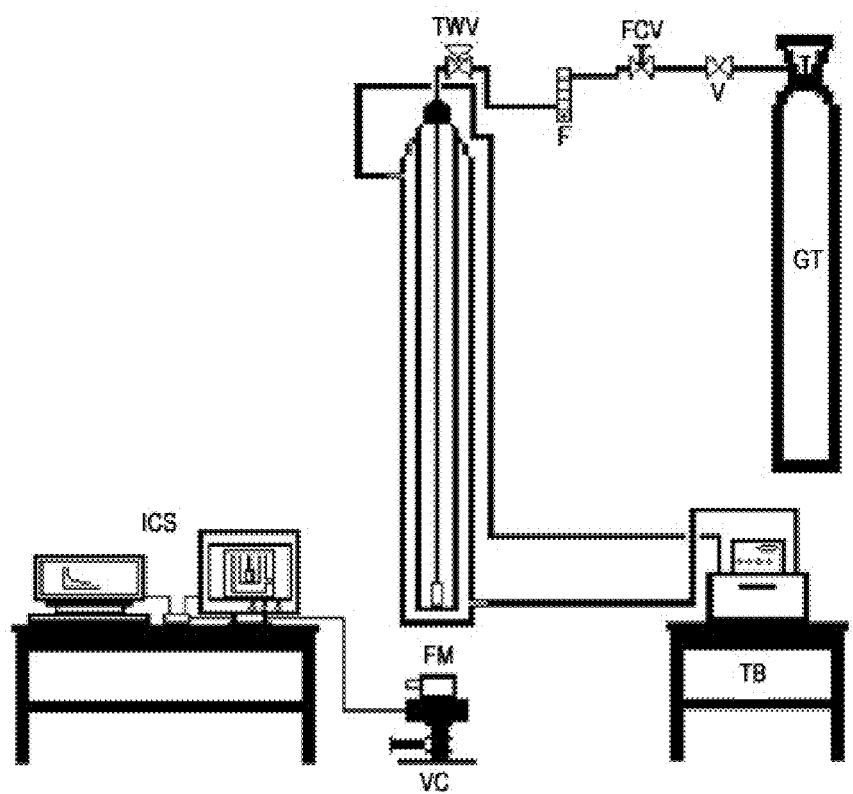

The present invention relates to a foaming composition with enhanced stability which controls the piping of gas in reservoirs of the naturally fractured carbonated type with high temperature and salinity conditions, by means the synergistic effect resulting from the supramolecular interaction of sodium alpha-olefin sulfonates with alkyl amido propyl betaines (1).

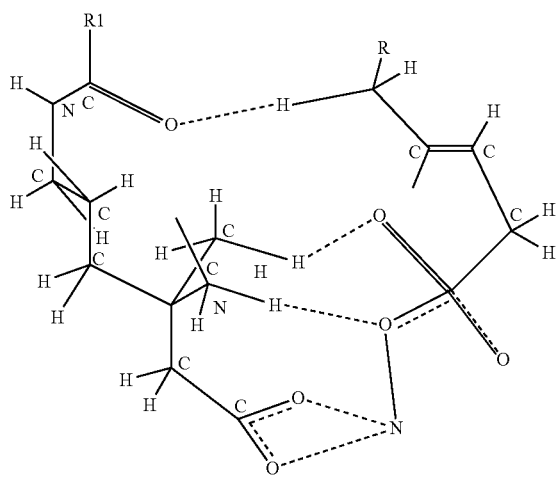

BACKGROUND OF THE INVENTION

Foams are gas dispersions in a small amount of a liquid with a broad field of application at the industrial level. In the oil industry, the use of foams has been extended to naturally fractured reservoirs and their main application has been in controlling the advance of gas in exhausted wells close to the gas-oil contact zone, as well as in enhanced recovery processes. In these types of applications, the stability of the foam plays a major role, and it depends on the chemical structure of the surfactant used to generate it, as well as on the existing temperature, pressure and salinity conditions in the reservoir.

The main chemical families of surfactants that have been used to generate foams applied in enhanced recovery processes include: 1) Alkyl-aryl-sulfonates (U.S. Pat. No. 5,273,682), 2) Alkoxy-alkyl-benzene sulfonates (U.S. Pat. No. 5,049,311), 3) Alpha olefin sulfonates (U.S. Pat. No. 4,607,695), 4) Betaines (U.S. Pat. No. 7,104,327) and 5) Alkyl ether sulfates (Department of Energy of the United States of America DE-FC26-03NT15406 Report). However, when the temperature conditions within the reservoirs are elevated (higher than 70° C.), with salinity exceeding 30000 ppm total solids and the concentration of divalent ions, such as calcium and magnesium, is higher than 2000 ppm, the stability of the foam generated by this surfactant chemical families class decreases dramatically.

In order to increase the foams' stability and, hence, their tolerance to high concentrations of divalent ions and/or high temperature, formulations of foaming agents with enhanced properties have been developed, such as the following:

U.S. Pat. No. 3,939,911 describes a three surfactant system applied to enhanced recovery processes in high temperature reservoirs wherein the formation water contains from 200 to 14000 ppm of dissolved polyvalent ions, such as calcium and magnesium. The three surfactant system comprises: 1) Water-soluble salt of an alkyl or alkylaryl sulfonate wherein the alkyl chain may have from 5 to 25 carbon atoms, 2) A phosphate ester surfactant with an average molecular weight not to exceed 1000 AMU and 3) A sulfobetain-based surfactant having the structural formula (2) wherein R is an alkyl group having from 12 to 24 carbon atoms. The combination is stable up to a temperature of at least 107° C. and resistant to bacterial attack and inhibits scale formation.

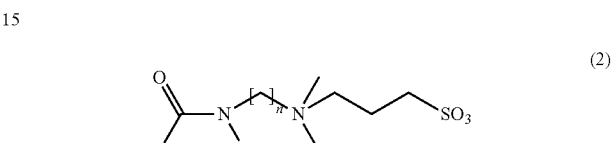

U.S. Pat. No. 4,703,797 refers to a method for sweep improvement during enhanced oil recovery processes. Said method concerns the generation of foam by the dispersion of the displacing liquid in an aqueous solution containing a surfactant formulation. The surfactant formulation comprises a lignosulfonate-based foaming agent and a surfactant foaming agent. The surfactant foaming agents disclosed include the group consisting of anionic, nonionic and amphoteric surfactants.

U.S. Pat. No. 5,295,540 refers to a foam-based method for improving oil production in subterranean formations comprising: 1) Injecting steam and liquids produced within the formation and 2) Injecting a mixture of steam, a noncondensible gas and an aqueous surfactant-polysaccharide mixture. The disclosed surfactants that may be used include linear toluene sulfonates, alkylaryl sulfonates, dialkykaril sulfonates, alpha olefin sulfonates and dimerized alpha olefin sulfonates.

U.S. Pat. No. 5,542,474 refers to a foam-based method for improving the performance during the steam or carbon dioxide flood in subterranean, crude oil-containing formations comprising at least one production well and one injection well. In the oil recovery process, sweep efficiency through the delivery of steam is improved by: 1) Injecting steam until it starts appearing within the production well and 2) Thereafter, adding a mixture of steam, a noncondensible gas and an aqueous surfactant-polypeptide solution into the formation. The aqueous surfactant-polypeptide solution forms a stable foam with the formation oil at formation conditions. The surfactants used as the base for the foaming agent include sodium and ammonium salts of ethoxylated sulfated alcohols, linear alcohol ethoxylates and linear toluene sulfonates.

The paper "Improving the foam performance for mobility control and improved sweep efficiency in gas flooding" (*Ind. Eng. Chem. Res.* 2004, 43, 4413-4421) refers that the apparent stability and viscosity of an alpha olefin sulfonates-generated foam in brine with total concentrations of dissolved solids ranging from 30000 to 120000 ppm are substantially improved when formulated with partially hydrolyzed polyacrylamide-based polymers or biopolymers of the xanthan gum type. Moreover, the paper reports that the stability of foams generated by 12-carbon alpha olefin sulfonates is substantially increased when formulated with surfactants of the amine oxide type.

U.S. Pat. No. 7,104,327 provides methods for fracturing high temperature subterranean zones and foamed and viscous aqueous fracturing fluids therefor. The fracturing fluid of said invention comprises water, a terpolymer of 2-acrylamido-2-methylpropane-sulfonic acid, acrylamide and acrylic acid or salts thereof, a gas, a foaming agent and a viscosity breaker for controlling and reducing the viscosity of the fracturing fluid. The foaming agent in said invention is selected from the group consisting of $C_8$-$C_{22}$ alkylamido-betaine, alpha olefin sulfonate, trimethyl-tallow-ammonium chloride, $C_8$-$C_{22}$ alkylethoxylate sulfate and trimethyl-coco-ammonium chloride, and coco-amidopropyl betaine is specially mentioned as a foaming agent. Said invention never discloses using alkylamido-betaine and alpha olefin sulfonate mixtures to produce foams, or making use of the synergistic effect of the supramolecular complex thereof, which increases the stability of foams.

The synergistic effect of alkyl amido propyl betaines with anionic surfactants of the alkyl ether sodium sulfate and alkyl sodium sulfate type has been studied in the literature (*Langmuir* 2000, 16, 1000-1013, *Langmuir* 2004, 20, 565-571, *Langmuir* 2004, 20, 5445-5453), mainly indicating the alkyl amido propyl betaines ability to stabilize and enhance the rheological properties (viscosity) of foams generated by said anionic surfactants and that they can be applied in shampoos and hair conditioners. Additionally, the paper "Synergistic sphere-to-rod micelle transition in mixed solutions of sodium dodecyl sulfate and cocoamidopropyl betaine" (*Langmuir* 2004, 20, 565-571) indicates that the synergistic effect between Cocoamidopropyl betaine and sodium dodecyl sulfate is due to an electrostatic attraction between both surfactants' heads (3).

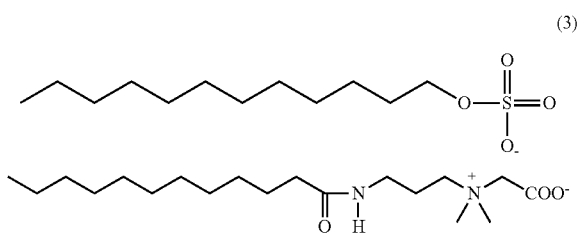

(3)

The patent application U.S. 2007/0142235 A1 protects a composition and process for recovering oil, which consist in injecting an aqueous solution into a subterranean oil-bearing formation through one or more injection wells, displacing the solution into the formation, and recovering the oil from one or more production wells. The aqueous solution contains one or more amphoteric surfactants of the alkyl amido betaines type that form a viscoelastic surfactant gel that is able to reduce the interfacial tension and increase the viscosity of the injection fluid simultaneously in certain oils and brines. Viscoelastic gels are tolerant to electrolytes and multivalent cations, and are particularly useful within reservoirs characterized by medium to high temperatures, high salinity, high concentrations of divalent ions and low porosity. The application refers that the composition for recovering oil comprises one or more amphoteric surfactants selected for their ability to lower the interfacial tension and to increase viscosity simultaneously, an aqueous medium, a secondary surfactant and, optionally, one or more polymers to provide residual viscosity. The patent application indicates that one of the amphoteric surfactants (4), that the secondary surfactant can be selected from the anionic, cationic or non-ionic group, and that the polymer used to provide residual viscosity is selected from the polyacrylamide, partially hydrolyzed polyacrylamide, xanthan gum, hydroxyethyl cellulose or guar gum group. Moreover, the patent application refers that the combination of alkyl amido betaines with secondary surfactants of the linear sodium dodecylbenzene sulfonate and arylalkyl sodium xylene sulfonate type reduces interfacial tension and increases the viscosity of the system. The patent application does not refer using alkyl amido betaines-based amphoteric surfactants and mixtures thereof to generate foams, nor does it disclose using mixtures of alkyl amido betaines and anionic surfactants of the alpha olefin sulfonates type.

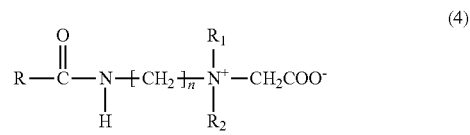

(4)

On the other hand, supramolecular chemistry is the part of chemistry that deals with the study of systems involving molecules or ions aggregates bound through non-covalent interactions, including electrostatic interactions, hydrogen bonds, π-π interactions, dispersion interactions and solvophobic effects. Supramolecular chemistry can be divided into two large areas: 1) Host-Guest Chemistry and 2) Self-assembly. The difference between these two large areas is a matter of size and form; where there is no significant difference in terms of size and none of the species acts as a host for the other, the non-covalent bond between two or more species is referred to as self-assembly.

From an energetic point of view, supramolecular interactions are much weaker than covalent interactions, which are located within the 150 to 450 Kj/mol energetic range for single bonds. The non-covalent interactions energetic interval ranges from 2 kj/mol for dispersion interactions to up to 300 kj/mol for ion-ion interactions (Table 1), and the sum of several supramolecular interactions can result in highly stable supramolecular complexes.

TABLE 1

Strength of Supramolecular Interactions

| Interaction | Strength (Kj/mol) |
| --- | --- |
| Ion-ion | 200-300 |
| Ion-dipole | 50-200 |
| Dipole-dipole | 5-50 |
| Hydrogen bond | 4-120 |
| Cation-π | 5-80 |
| π-π | 0-50 |
| Van der Walls | <5 |
| Hydrophobic | Solvent-solvent interaction energy-related |

Computational chemistry is a world-wide extensively used tool for predicting the stability and structure of chemical systems with enhanced potential properties and it has found its application at the industrial level in the development of structure-activity ratio quantitative studies. The computational calculation methods that have been used for this purpose include molecular mechanics methods, quantum methods, including semi-empirical and ab initio methods, as well as the density functional theory methods. As examples in the literature showing the use of computational chemistry for accurately predicting supramolecular interactions in chemical systems and/or chemical processes thermodynamic and kinetic aspects we can quote the papers: 1) Cornucopian Cylindrical Aggregate Morphologies from Self-Assembly of Amphiphilic Triblock Copolymer in Selective Media (*Journal of Physical Chemistry B*, 2005, 109, 21549-21555), 2) Density Functional Calculations, Synthesis, and Characterization of Two Novel Quadruple Hydrogen-Bonded Supramolecular Complexes (*Journal of Physical Chemistry A*, 2004, 108, 5258-5267), 3) Strong Decrease of the Benzene-Ammonium Ion Interaction upon Complexation with a Carboxylate Anion (*Journal of American Chemical Society*, 1999, 121, 2303-2306).

None of said references claims the use of foaming additives applying the synergistic effect of alpha olefin sodium sulfonates and alkyl amido propyl betaines for the development of formulations able to perform in high salinity and temperature environments. This invention presents the advantage of the generated formulations working efficiently in high salinity and temperature environments with high concentrations of calcium and magnesium divalent ions, and, furthermore, the generated foam shows superior stability compared to that generated by the currently used products worldwide.

BRIEF DESCRIPTION OF THE INVENTION DRAWINGS

Next, a description of the contents of the present invention's figures:

FIG. 1. Schematic diagram of the foam generation system, which allows for the foam stability to be assessed at atmospheric pressure and at up to 100° C. This system comprises the following elements: 1) Gas tank (GT), 2) foam meter (FM), 3) flow meter (F), 4) thermal bath (TB), 5) Video camera (VC), 6) Image capturing system (ICS), 7) Flow controlling valve (FCV), 8) Three-way valve (TWV) and 9) Valve.

Figure 2:
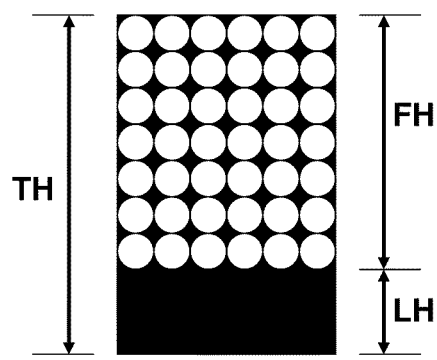

FIG. 2. Readings to be recorded during the foam stability test, where: TH=Total height, FH=Foam height and LH=Liquid height.

Figure 3:
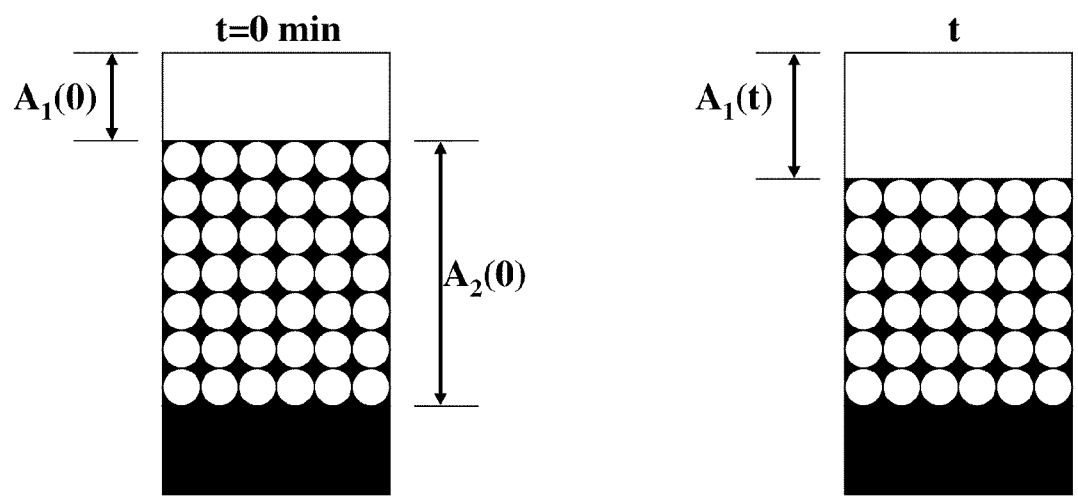

FIG. 3. Necessary readings for the calculation of the foam stability.

Figure 4:
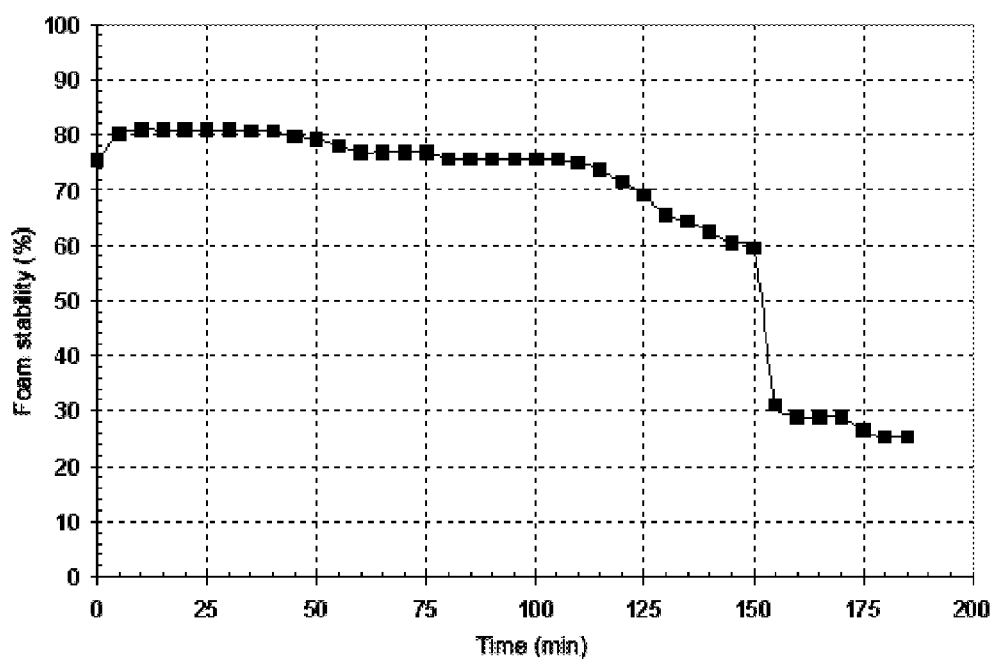

FIG. 4. Stability performance over time, at 1 kg/cm$^2$ and 75° C., of the foam prepared with brine at 1% by weight of molecular complexes 9.

Figure 5:
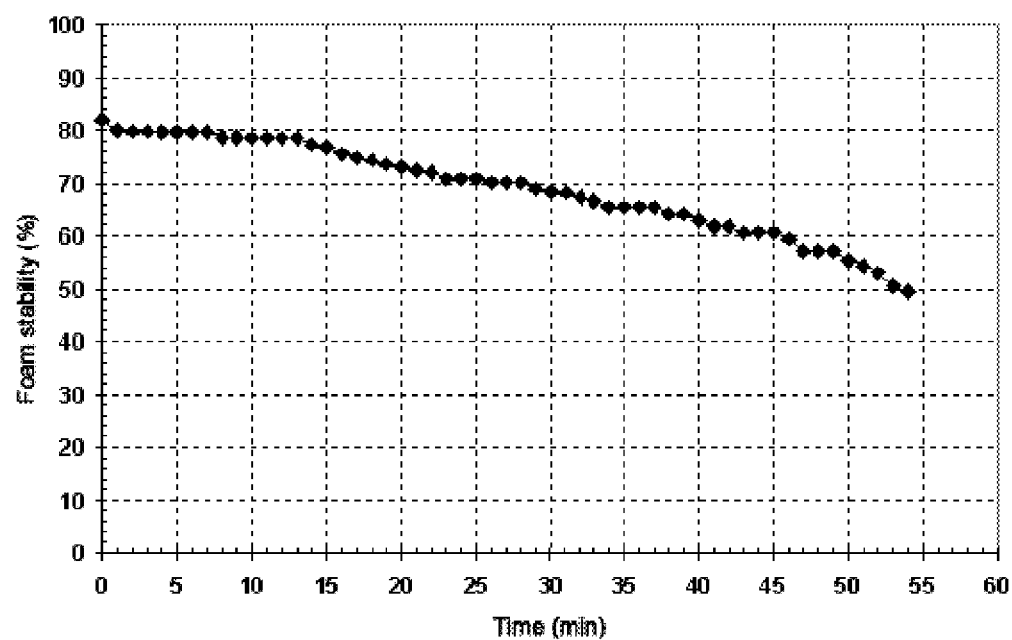

FIG. 5. Stability performance over time, at 1 kg/cm$^2$ and 75° C., of the foam prepared with brine at 1% by weight of sodium dodec-2-en-1-sulfonate 10.

Figure 6:
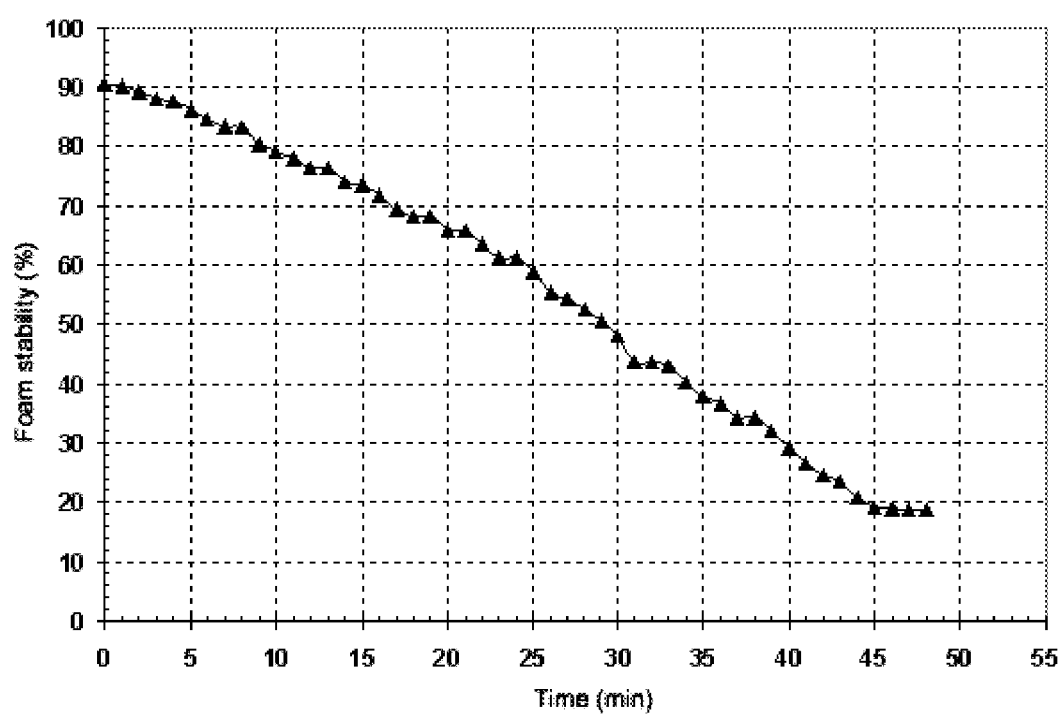

FIG. 6. Stability performance over time, at 1 kg/cm$^2$ and 75° C., of the foam prepared with brine at 1% by weight of coco-amido-propyl betaine 11.

Figure 7:
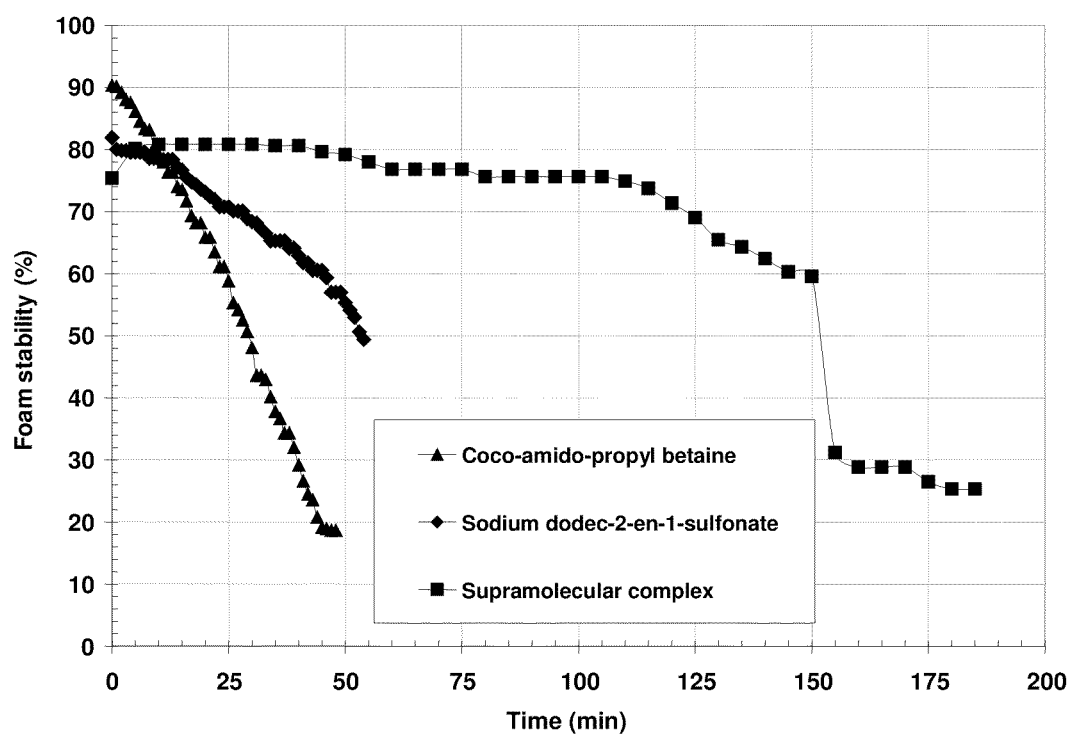

FIG. 7. Stability over time, at 1 kg/cm$^2$ and 75° C., of the foams generated with different chemical products (supramolecular complexes 9, sodium dodec-2-en-1-sulfonate 10, and coco-amido-propyl betaine 11) at 1% by weight.

Figure 8:
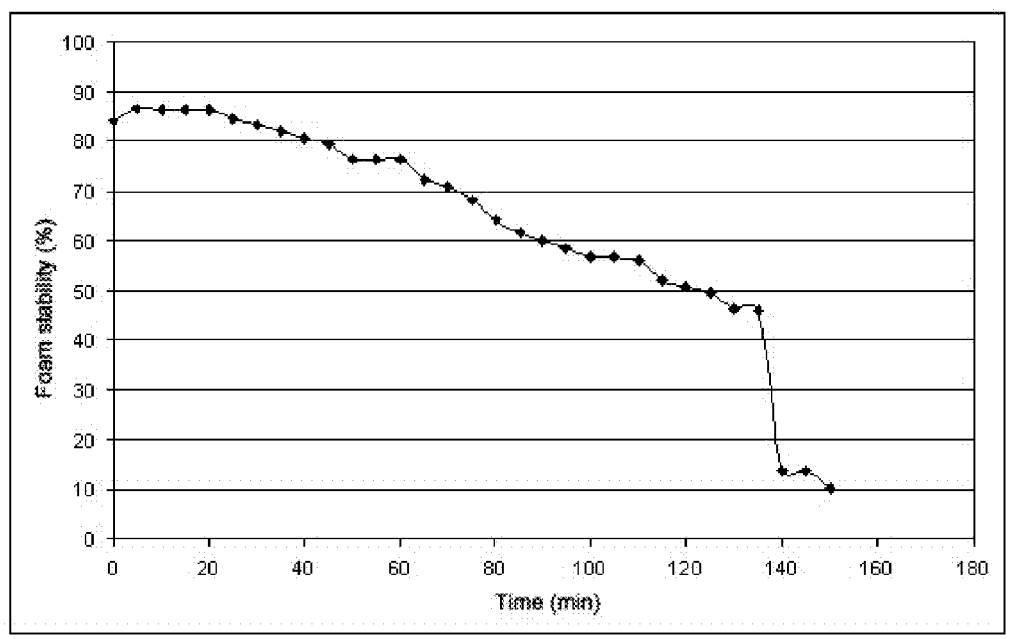

FIG. 8. Stability performance over time, at 1 kg/cm$^2$ and 75° C., of the foam prepared with brine at 1% by weight of formulation A.

Figure 9:
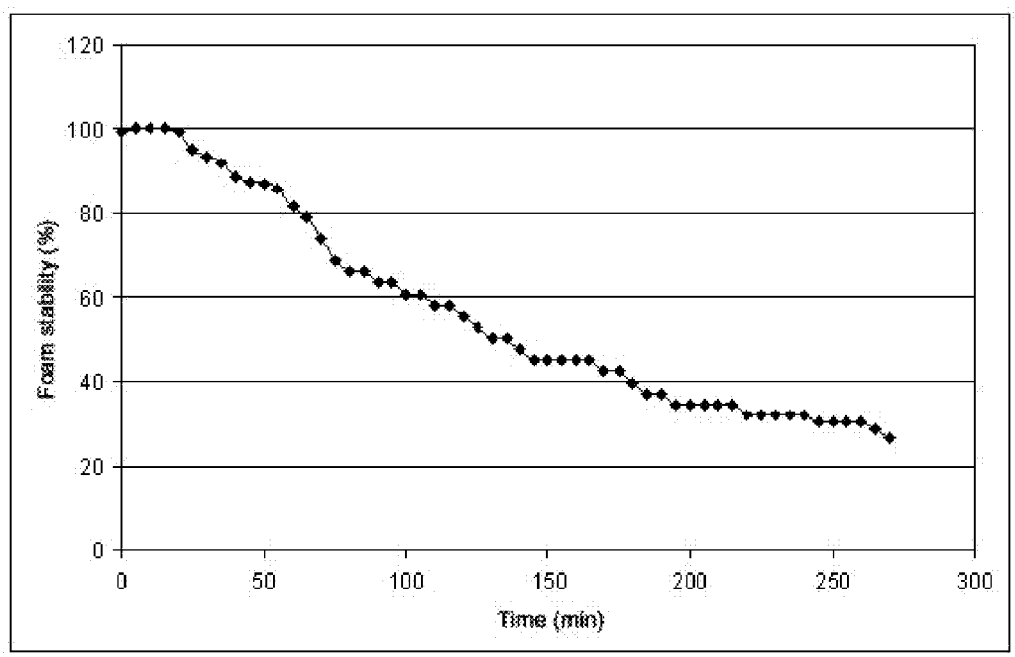

FIG. 9. Stability performance over time, at 1 kg/cm$^2$ and 75° C., of the foam prepared with brine at 1% of formulation B.

Figure 10:
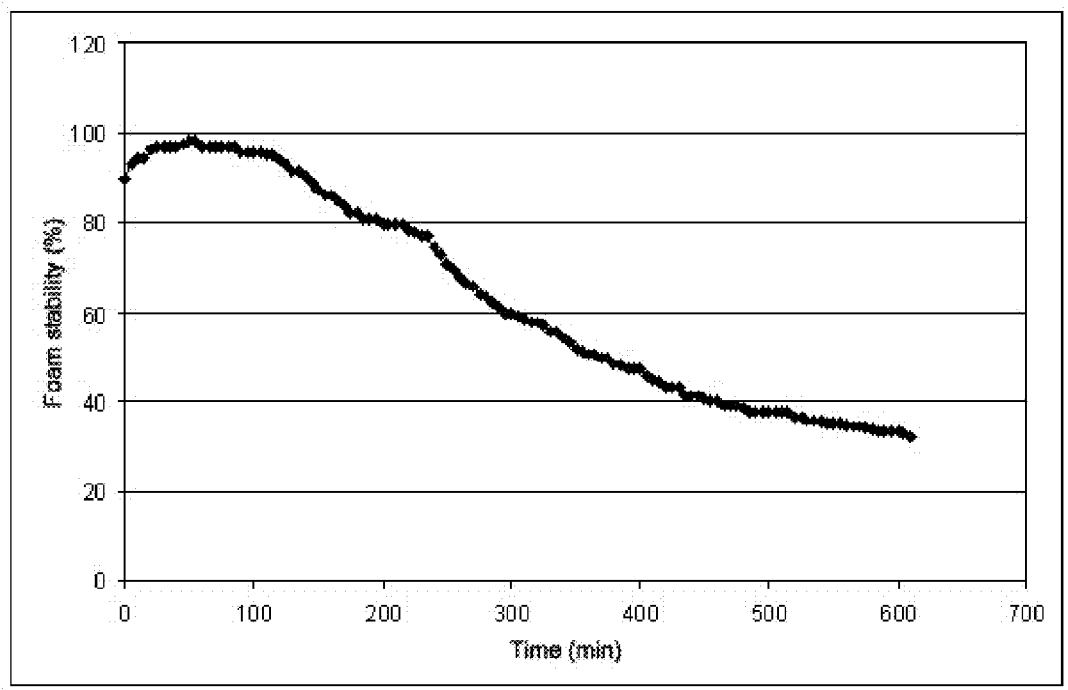

FIG. 10. Stability performance over time, at 1 kg/cm$^2$ and 75° C., of the foam prepared with brine at 1% of formulation C.

Figure 11:
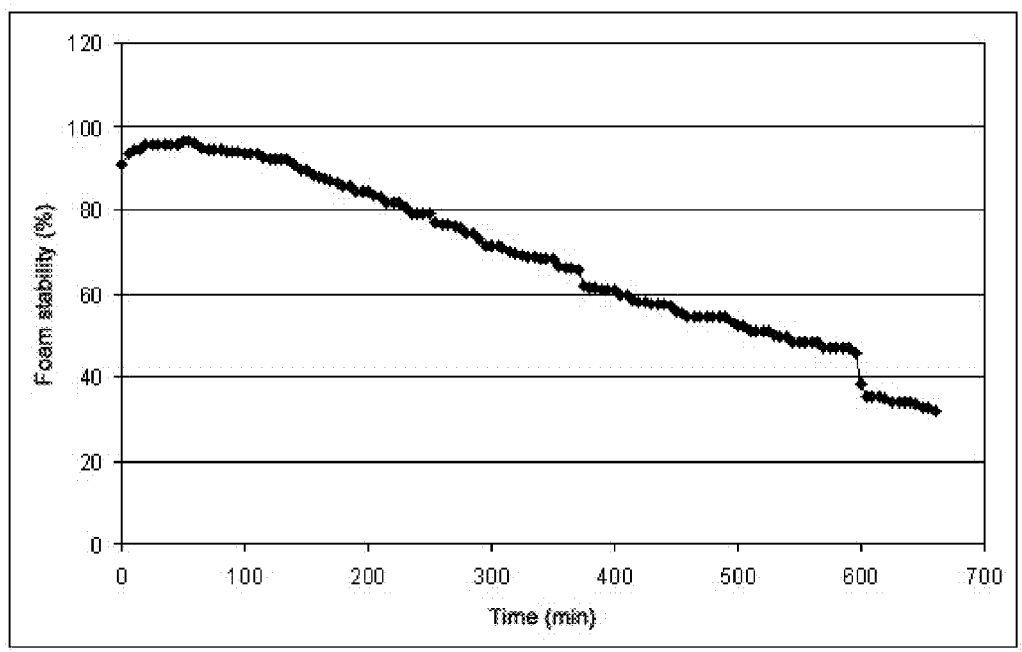

FIG. 11. Stability performance over time, of the foam at 1 kg/cm$^2$ and 75° C., prepared with brine at 1% of formulation D.

Figure 12:
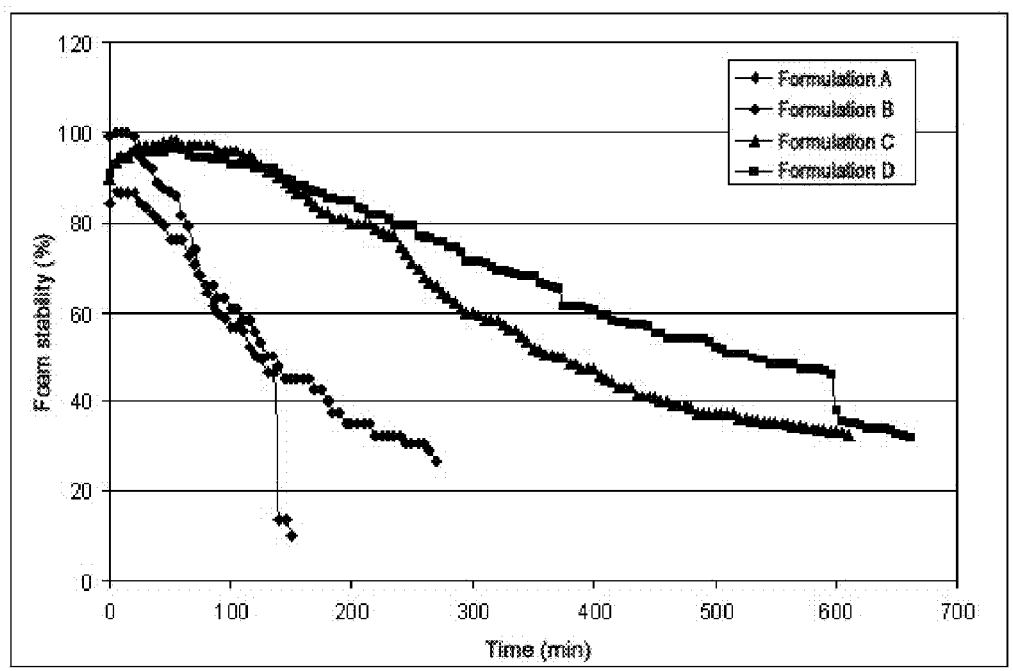

FIG. 12. Stability over time, at 1 kg/cm$^2$ and 75° C., of the foams generated with different chemical products (formulation A, formulation B, formulation C and formulation D) at 1% by weight.

Figure 13:
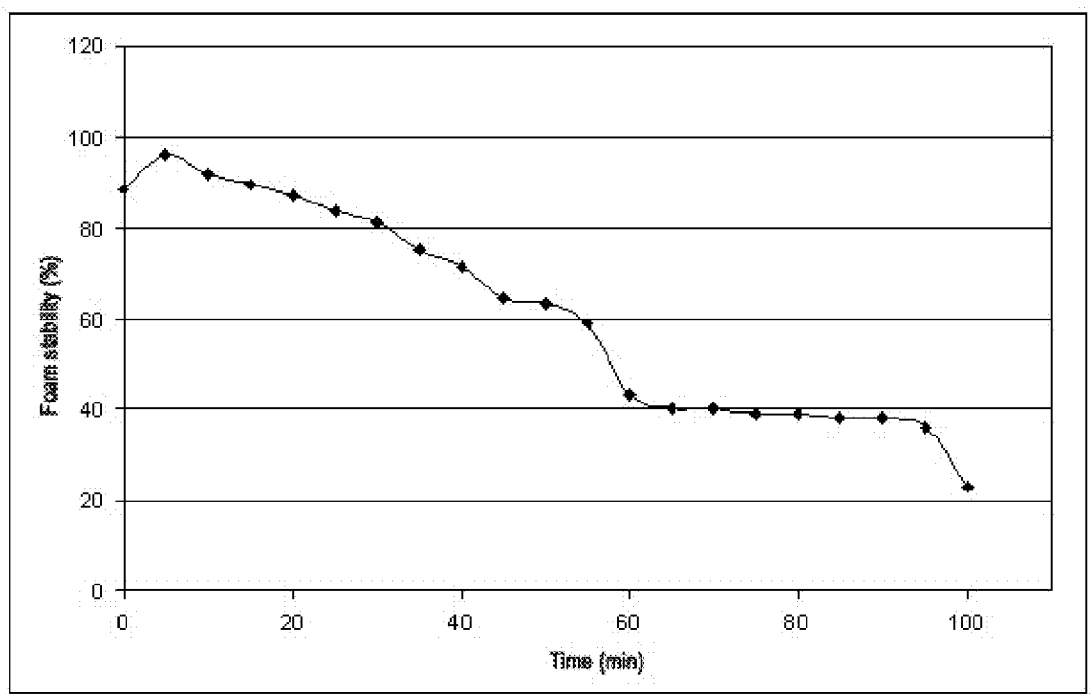

FIG. 13. Stability performance over time, at 1 kg/cm$^2$ and 75° C., of the foam prepared with brine at 1% by weight of supramolecular complexes 9.

Figure 14:
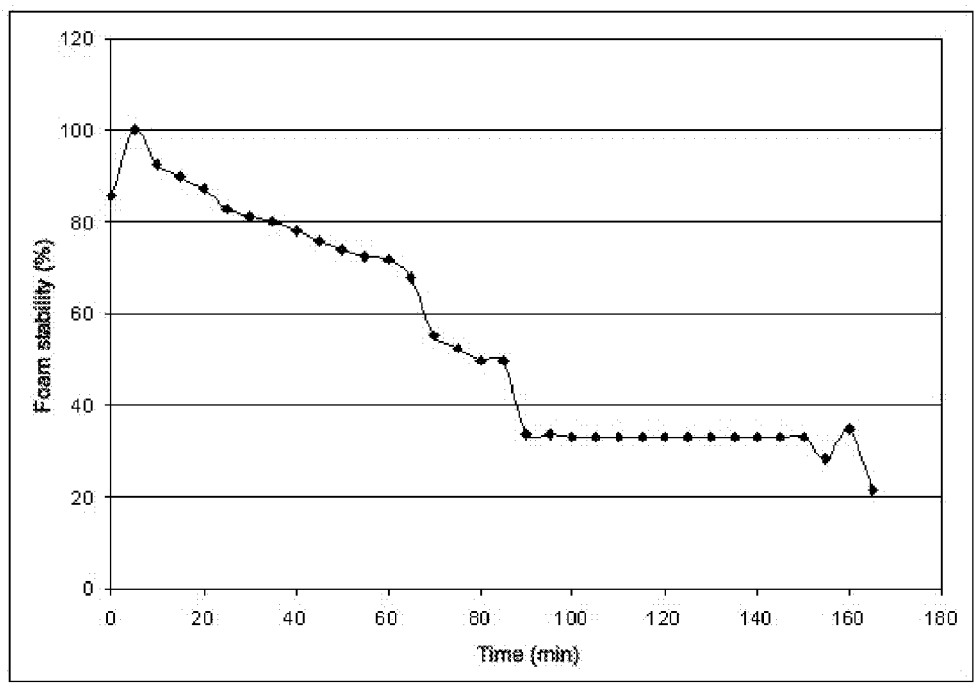

FIG. 14. Stability performance over time, at 1 kg/cm$^2$ and 75° C., of the foam prepared with brine at 1% by weight of formulation E.

Figure 15:
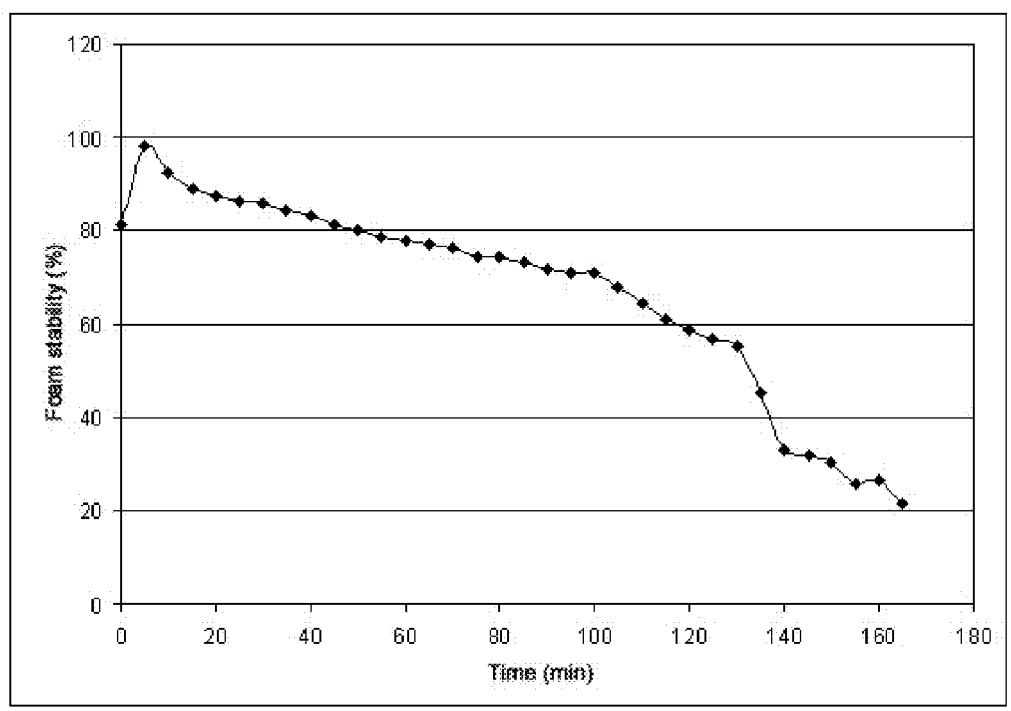

FIG. 15. Stability performance over time, at 1 kg/cm$^2$ and 75° C., of the foam prepared with brine at 1% of formulation F.

Figure 16:
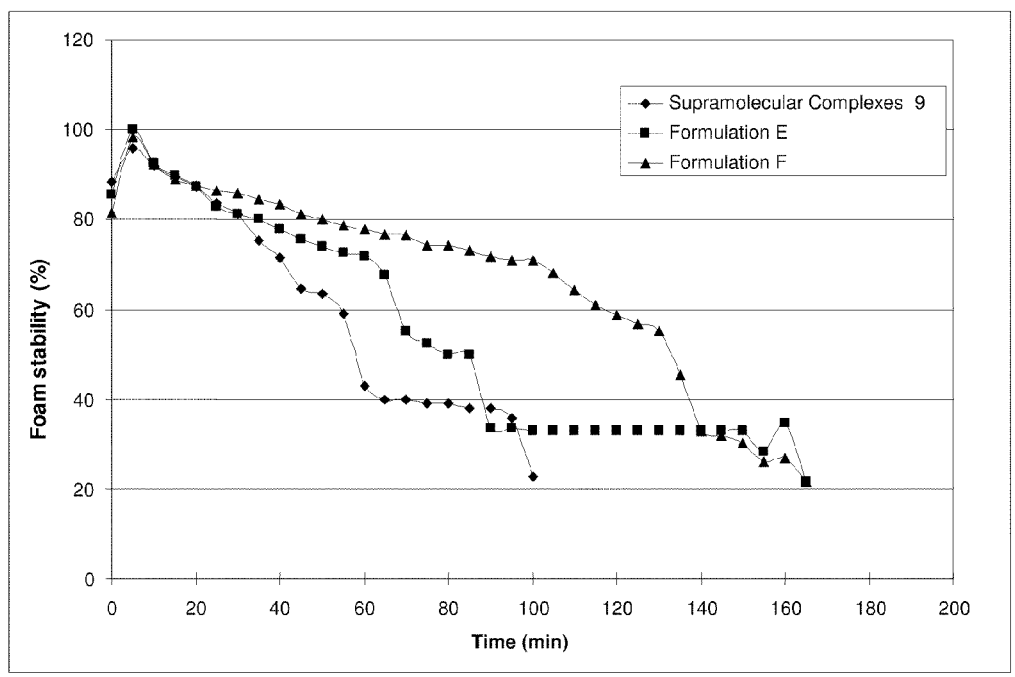

FIG. 16. Stability over time, at 1 kg/cm$^2$ and 75° C., of the foams generated with different chemical products (supramolecular complexes 9, formulation E and formulation F) at 1% by weight.

Figure 17:
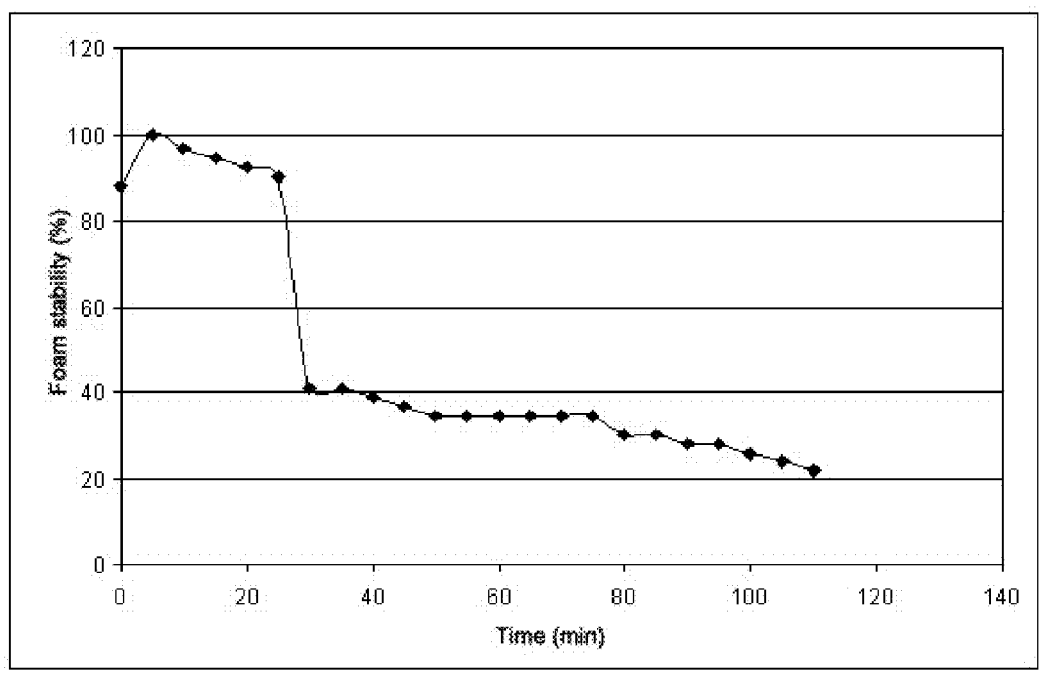

FIG. 17. Stability performance over time, at 1 kg/cm$^2$ and 75° C., of the foam prepared with brine at 1% by weight of supramolecular complexes 9.

Figure 18:
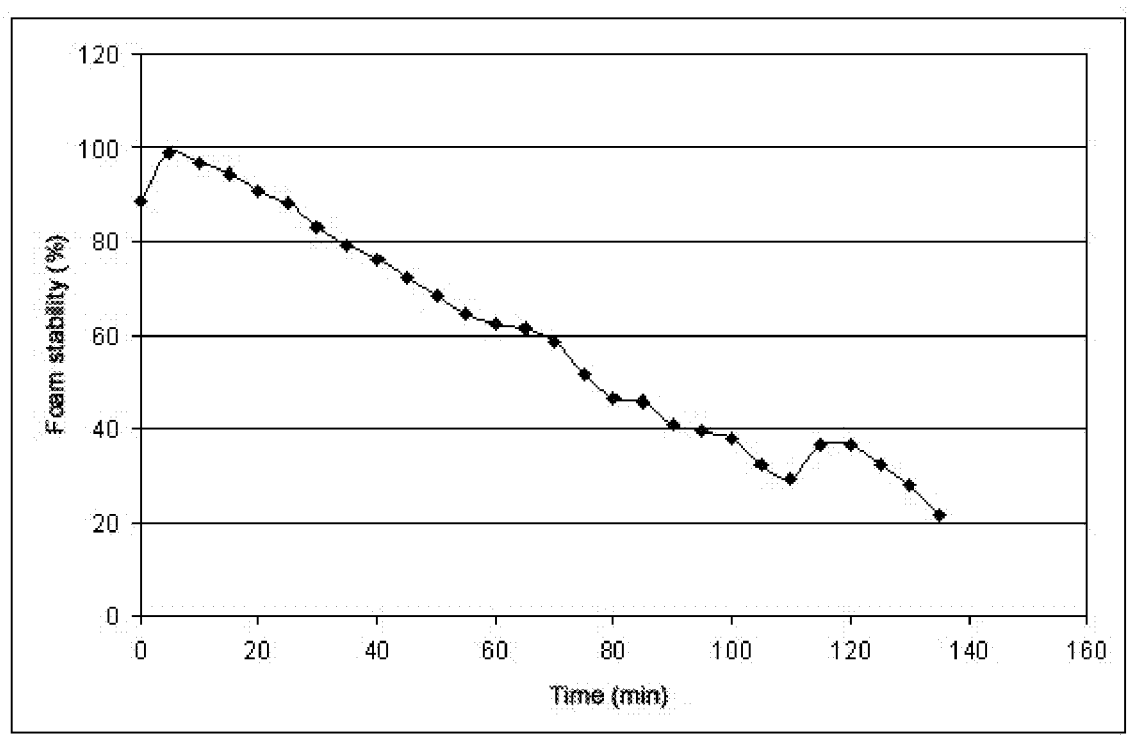

FIG. 18. Stability performance over time, at 1 kg/cm$^2$ and 75° C., of the foam prepared with brine at 1% by weight of formulation E.

Figure 19:
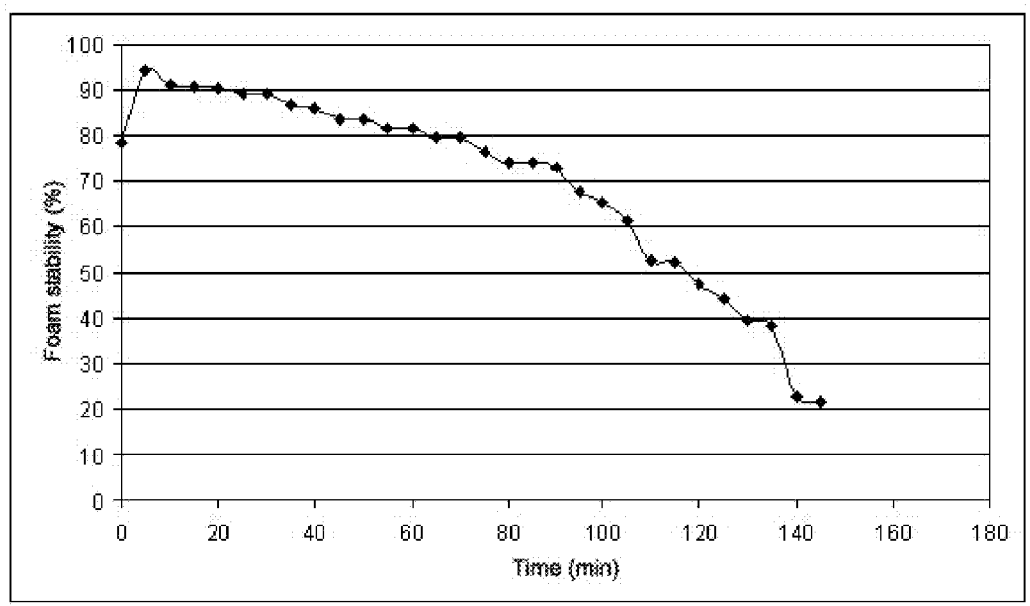

FIG. 19. Stability performance over time, at 1 kg/cm$^2$ and 75° C., of the foam prepared with brine at 1% of formulation F.

Figure 20:
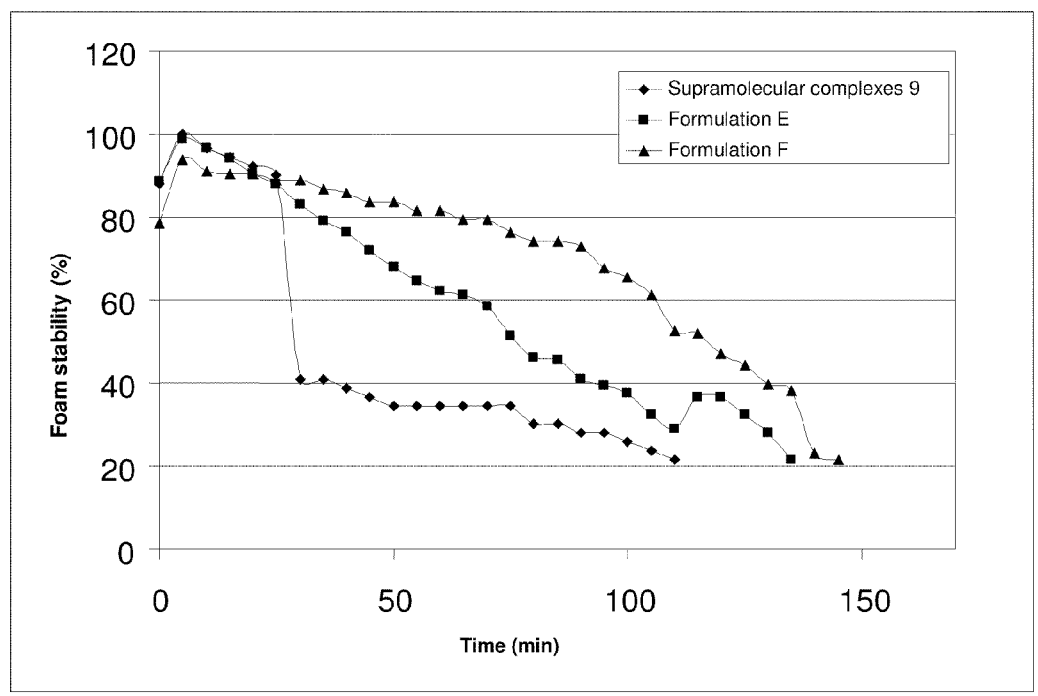

FIG. 20. Stability over time, at 1 kg/cm$^2$ and 75° C., of the foams generated with different chemical products (supramolecular complexes 9, formulation E and formulation F) at 1% by weight.

Figure 21:
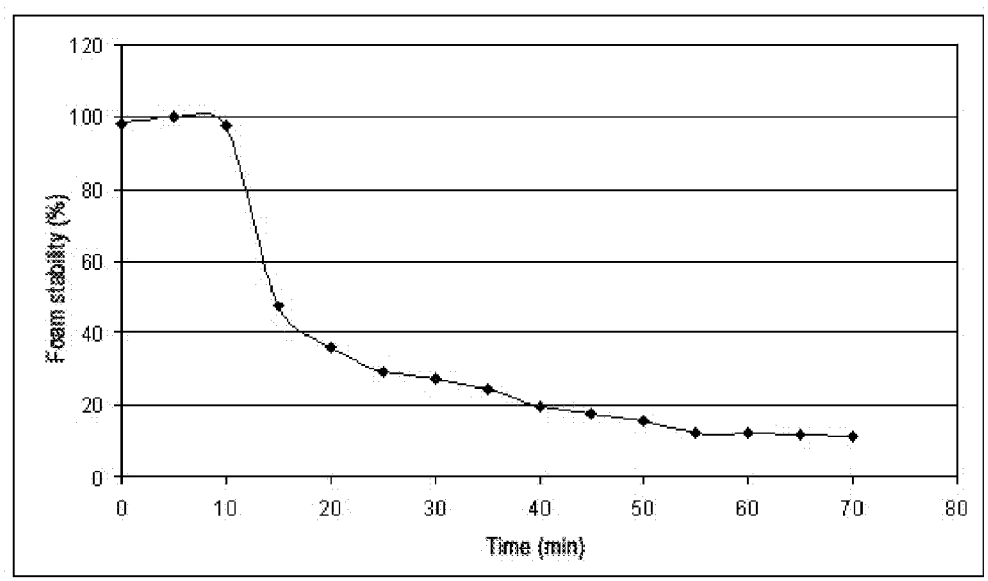

FIG. 21. Stability performance over time, at 1 kg/cm$^2$ and 75° C., of the foam prepared with brine at 1% by weight of supramolecular complexes 9.

Figure 22:
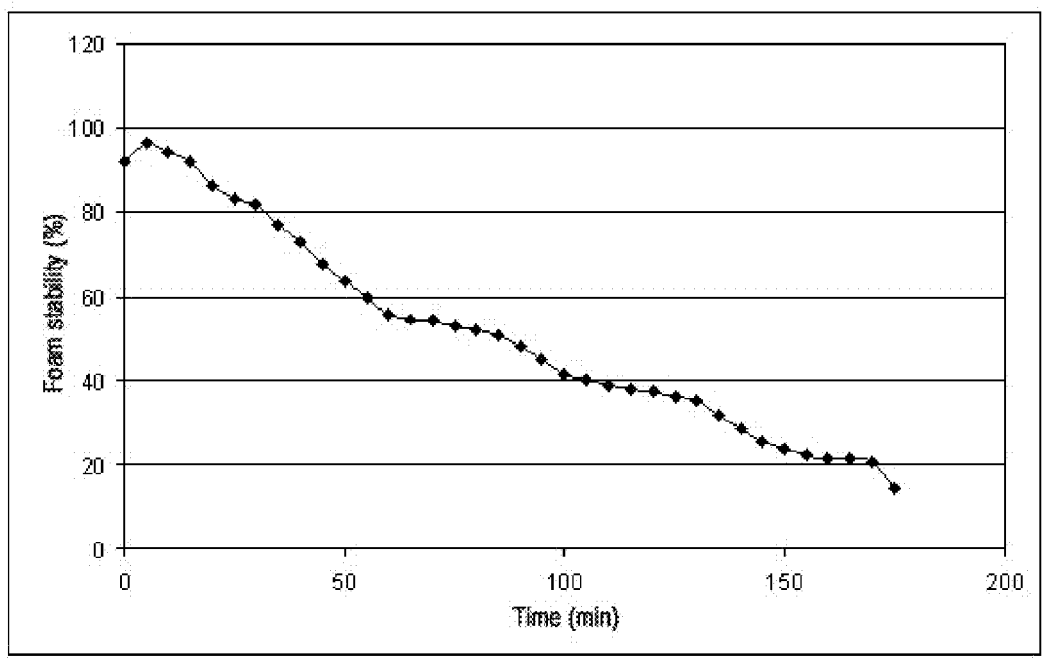

FIG. 22. Stability performance over time, at 1 kg/cm$^2$ and 75° C., of the foam prepared with brine at 1% by weight of formulation G.

Figure 23:
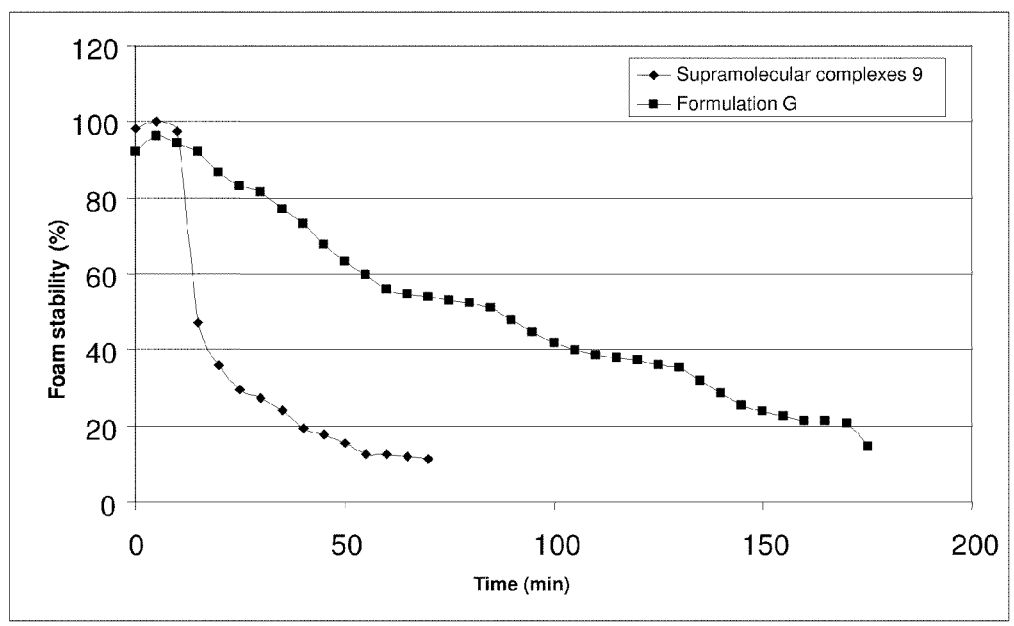

FIG. 23. Stability over time, at 1 kg/cm$^2$ and 75° C., of the foams generated with different chemical products (supramolecular complexes 9 and formulation G) at 1% by weight.

Figure 24:
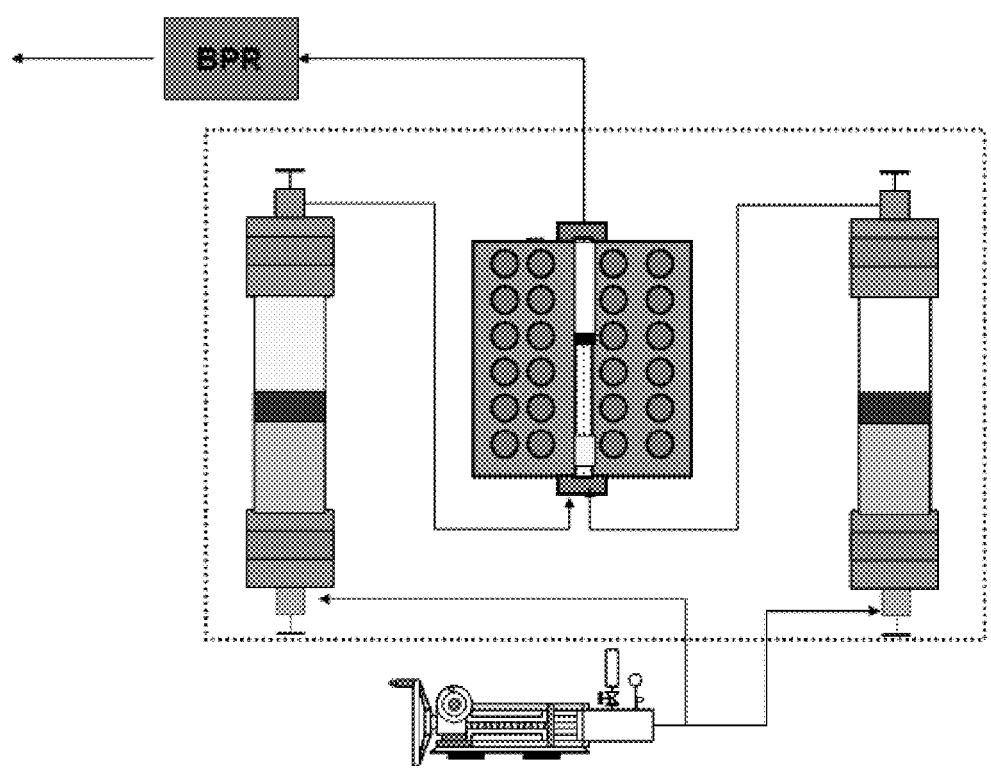

FIG. 24. PVT cell adapted and used for the foams stability test at high pressure and temperature, where: BPR=Pressure regulating valve.

Figure 25:
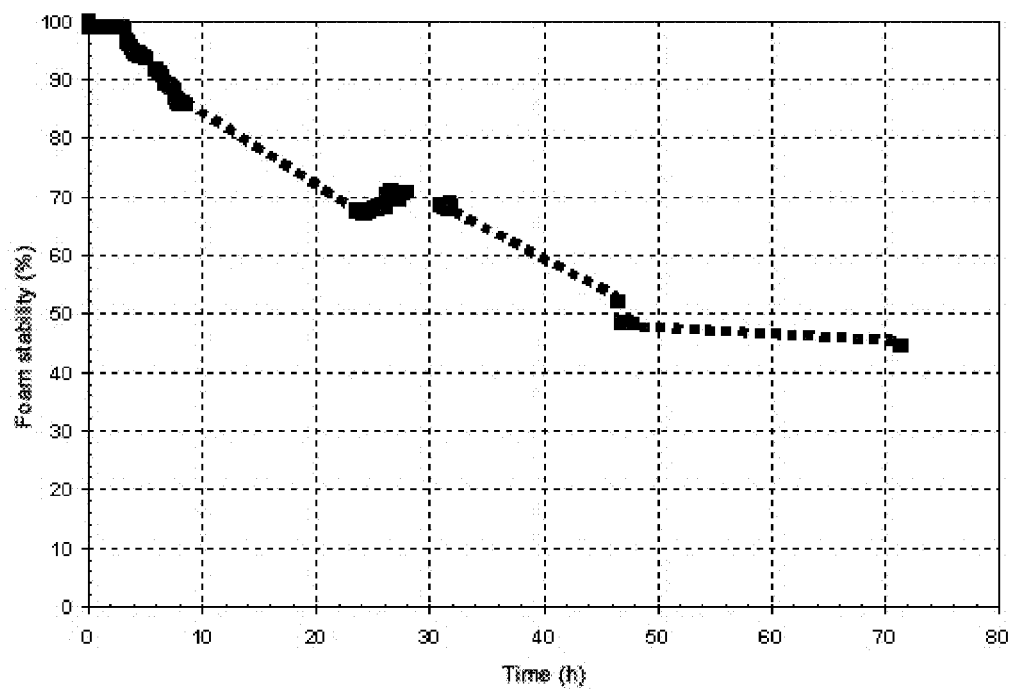

FIG. 25. Stability performance at 100 kg/cm$^2$ and 95° C. over time, of the foam formed with brine at 1% in weight of molecular complexes 9.

Figure 26:
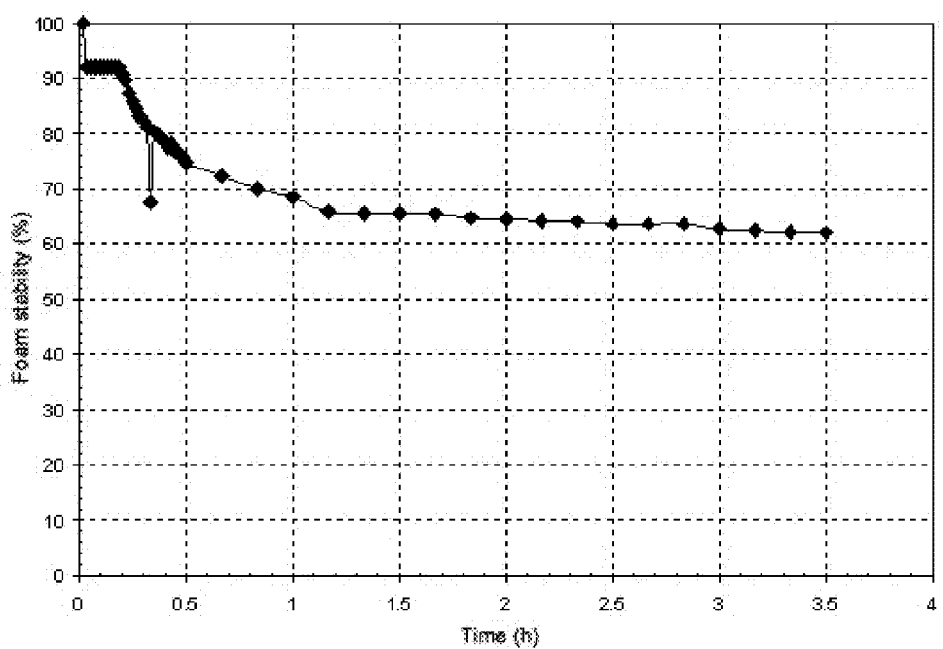

FIG. 26. Stability performance at 100 kg/cm² and 95° C. over time, of the foam formed with brine at 1% by weight of sodium dodec-2-en-1-sulfonate 10.

Figure 27:
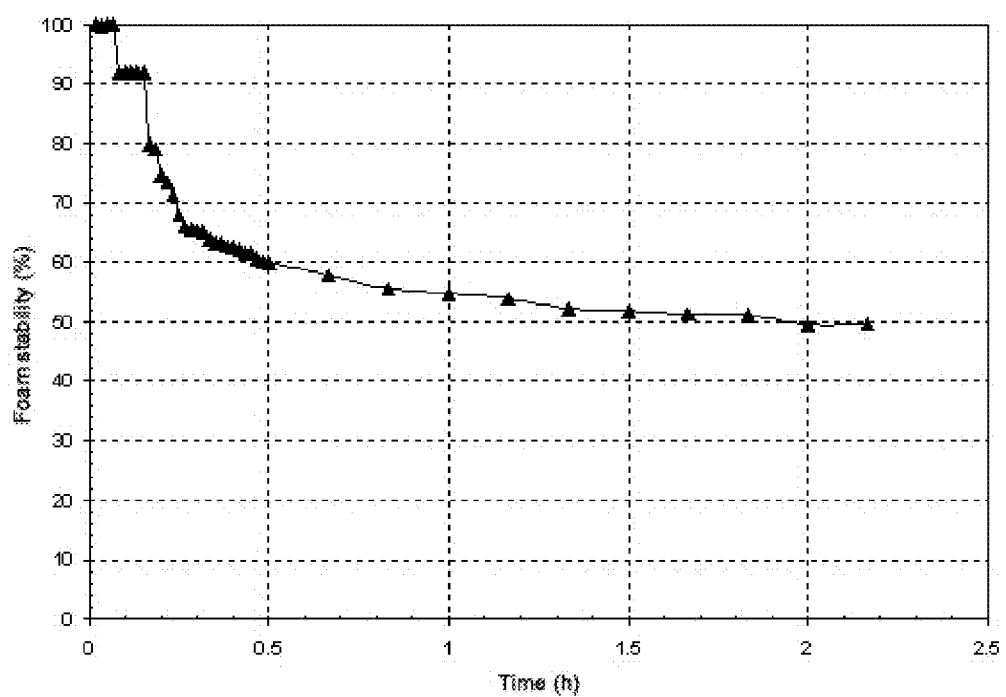

FIG. 27. Stability performance at 100 kg/cm² and 95° C. over time, of the foam formed with brine at 1% by weight of coco-amido-propyl betaine 11.

Figure 28:
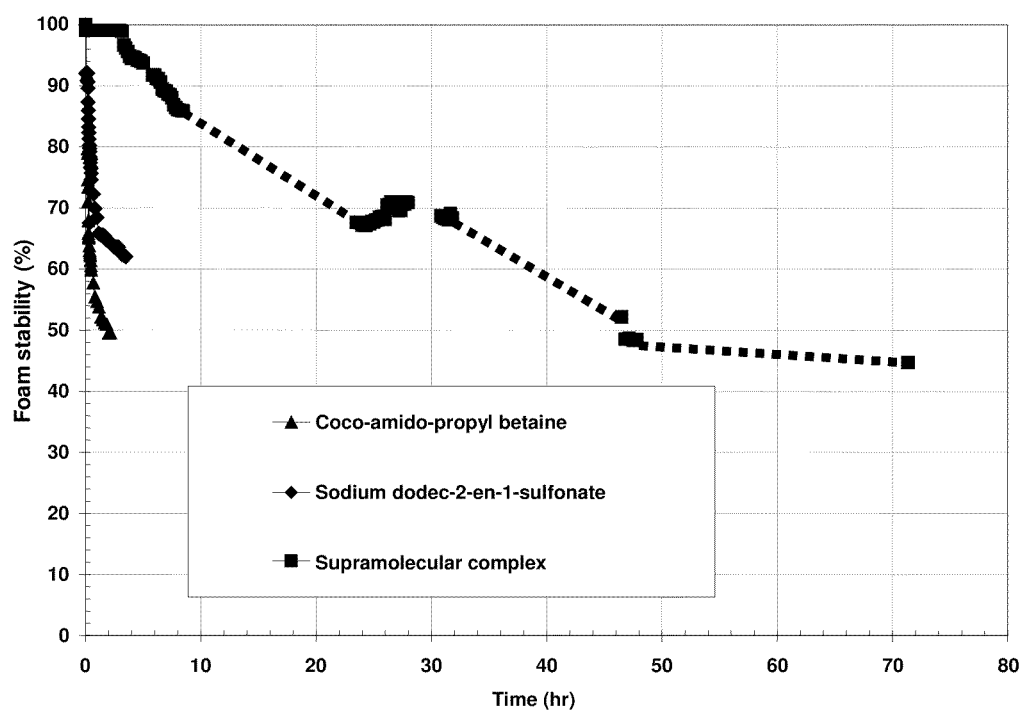

FIG. 28. Stability over time, at 100 kg/cm² and 95° C., of the foams generated with different chemical products (supramolecular complexes 9, dodec-2-en-1-sodium sulfonate 10 and coco-amido-propyl betaine 11) at 1% by weight.

Figure 29:
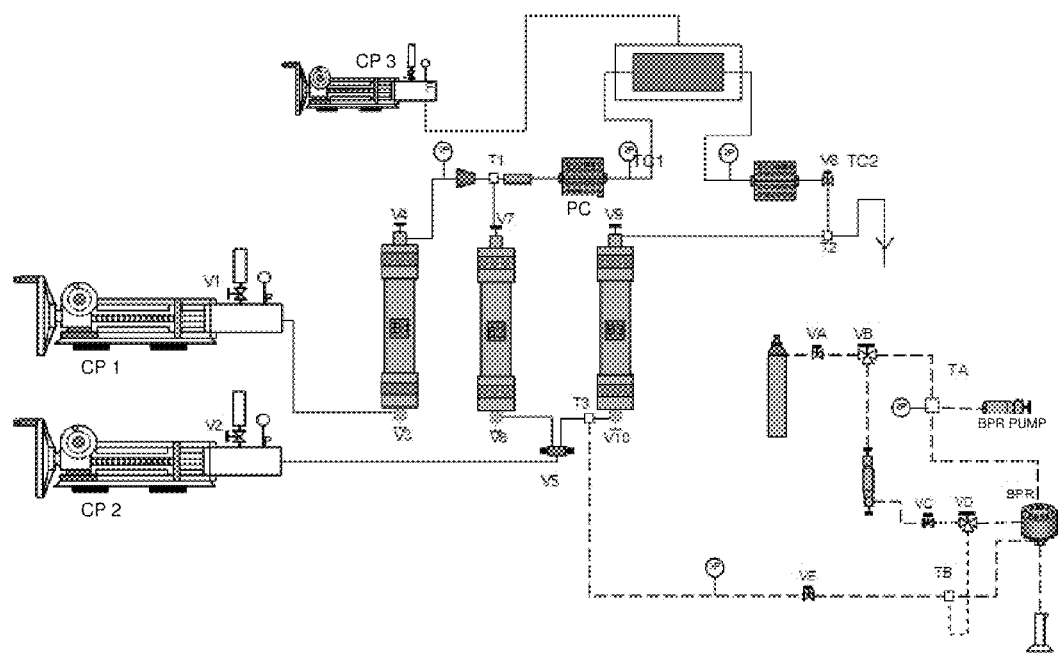

FIG. 29. Experimental array used for the control of gas piping, where CP1=Computerized pump for injection, CP2=Computerized pump for injection, CP3=Computerized pump for overpressure, V1 to V15=Shut-off valves, IP=Pressure gauge; PC=Packed column, TC1=Input visual cell; TC2=Output visual cell and BPR=Pressure regulation valve.

Figure 30:
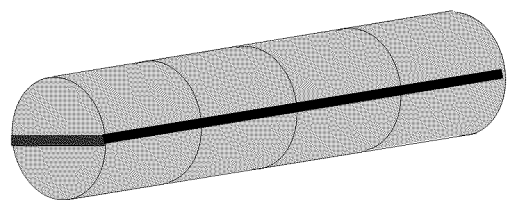

FIG. 30. Artificial longitudinal fracture used for the gas piping control test.

Figure 31:
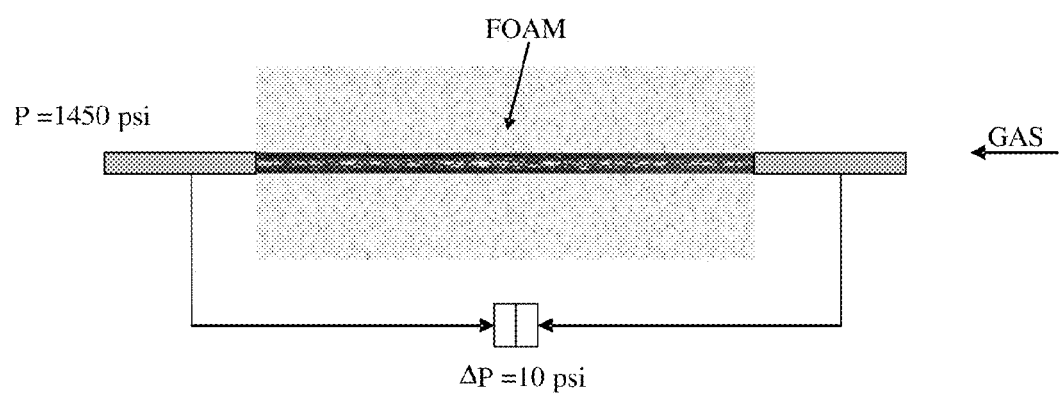

FIG. 31. Diagram showing the foam in a longitudinal fracture, where said foam is observed to resist a 10 psi pressure difference after two weeks.

DETAILED DESCRIPTION OF THE INVENTION

The present invention relates to the synergistic effect resulting from the supramolecular interaction of sodium alpha-olefin sulfonates with alkyl amido propyl betaines and its application in the development of enhanced-stability foaming formulations for the control of gas piping in reservoirs of the naturally fractured carbonate type with high salinity and temperature conditions.

The supramolecular complexes developed from the interaction of sodium alpha olefin sulfonates with alkyl amido propyl betaines show tolerance under high temperature and/or pressure conditions to the presence of divalent ions such as calcium and magnesium and, when used in formulations, they generate stable foams under such conditions, largely surpassing, in terms of performance as foaming agents, the sodium alpha olefin sulfonates or alkyl amido propyl betaines-based compounds traditionally used as foaming agents in formulations at the industrial level in low temperature processes and in brines with low concentrations of divalent ions.

The development of the present invention followed a procedure involving the following steps: 1) Molecular design through computational chemistry, 2) Supramolecular complexes synthesis, 3) Spectroscopic characterization of the supramolecular complexes and 4) Experimental assessment of the supramolecular complexes foaming properties. The selection of the present methodology is based on the fact that the key point in order to solve the problems of generating stable foams in brines with high concentrations of divalent ions and at high temperature and pressure conditions relies on the understanding, at the molecular level, on how to control the cationic exchange reaction between the foaming agent and the divalent ions under specific conditions.

The invention is directed to a composition with foaming properties characterized for containing as active component, in a % by weight ranging from 0.5 to 99.5%, supramolecular complexes with the following structural formula:

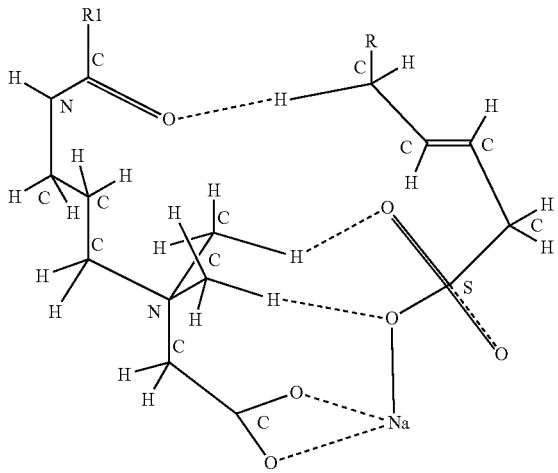

Wherein R and R1 are linear or branched independent alkyl chains and with a length thereof ranging from 1 to 30 carbon atoms.

In one embodiment, the composition comprises an aqueous solvent or alcohol or mixtures of alcohols in an amount of 0.5 to 99.5 wt %. The supramolecular complex can be included in the composition in an amount of 10 to 90% by weight, and preferably 25 to 75% by weight. The composition can be a foam obtained by mixing with a gas selected from the group consisting of nitrogen, oxygen, carbon dioxide, natural gas, methane, propane, butane, and mixtures thereof.

The composition of the invention can further contain a cationic surfactant such as alkyl trimethyl ammonium bromide or chloride. The composition can include sodium alpha olefin sulfonates, alkyl amido propyl betaines and alkyl ammonium quaternary salts in a weight ratio of 1:2:1 to 1:1.01:0.01. The composition can further include divalent ion sequestrants such as an itaconic acid-derived oligomers or copolymers having an average molecular weight ranging from 200 to 20000 Dalton.

The sodium alpha olefin sulfonates, alkyl amido propyl betaines and divalent ion sequestrant can be present in a weight ratio of 1:1:0.5 to 1:1:0.01. The sodium alpha olefin sulfonates, alkyl amido propyl betaines, cationic surfactant and divalent ion sequestrant can be present in a weight ratio of 1:2:1:0.5 to 1:1.01:0.01. The composition can further include a gel such as polymers or copolymers selected from the group consisting of polyacrylamides, partially hydrolyzed polyacrylamide, xanthan gum, poly(itaconic acid), poly(acrylic acid), poly(itaconic acid-co-acrylic acid), poly(itaconates) and poly(acrylates). The sodium alpha olefin sulfonates, alkyl amido propyl betaines and gel can be present in a weight ratio of 1:1:0.2 to 1:1:0.01.

1) Molecular Design Through Computational Chemistry

Before going into detail, and for clarification purposes, we should mention that currently, before engaging in the synthesis of a new compound or complex, it is customary to design, using theoretical calculations, a molecule by means of which to attempt solving a specific problem, and we did this the way we explain next.

Once established this, the first thing that is important pointing out is that the literature mentions that compounds of the alpha olefin sulfonates type may be used for the generation of foams at high temperatures and in brines with dissolved solids total concentrations from 30000 and 120000 ppm and whose divalent ions concentrations range from 2000 to 3800 ppm (*Industrial & Engineering Chemistry Research* 2004, 43, 4413-4421). Additionally, the stability of the generated foam depends drastically on the concentration of divalent ions, since the exchange of sodium ions for calcium or magnesium ions is thermodynamically favored, and alpha olefin sulfonates with divalent ions, which are compounds without foaming properties, are generated. On the other hand, the literature indicates that one way of increasing the viscosity of solutions that use sodium alkyl sulfates as foaming agents is through the use of coco amido propyl betaine, and that the mechanism driving such increase is through an electrostatic interaction between both surfactants' heads (*Langmuir* 2004, 20, 565-571). Furthermore, the fact that betaines have a high electronic density carbonyl group can result in the alpha olefin sulfonates' sodium atom strongly coordinating with said group, thus reducing the calcium or magnesium ions exchange rate at high temperatures in brines with high concentrations of stable ions, hence obtaining a more stable foam. Moreover, alkyl amido propyl betaines possess, in their structure, an amido group that is highly susceptible to supramolecularly interact with the alpha olefin sulfates allylic protons and thus considerably increasing the stability of the generated supramolecular complexes.

Theoretical calculations with the method ab initio and the set of 321-G bases were used in order to optimize the geometry in the gas phase and to determine the total energy and Mulliken atomic charges of sodium alpha olefin sulfonate- and alkyl-amidopropyl betaines-based compounds and supramolecular compounds derived from the interaction thereof. The structural formulas (5) of sodium but-2-en1-sulfonate (alpha olefin sulfonate) 1, ethyl-amido-propyl-betaine (alkyl-amido propyl betaine) 2 and supramolecular compound 3 derived from the interaction of said two compounds. Additionally, tables 2, 3 and 4 show the energetic results, the bonding distances and the main Mulliken atomic charges for said compounds and the corresponding supramolecular complex.

(5)

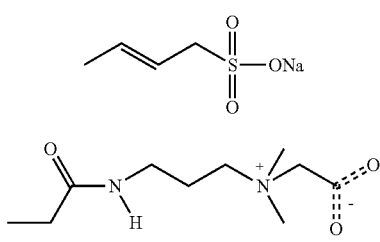

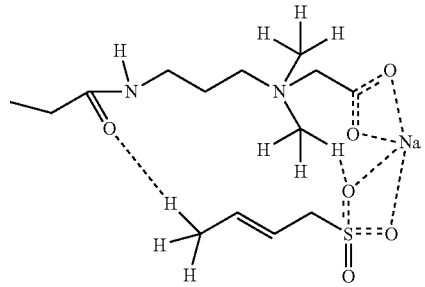

TABLE 2

Energy of compounds 1 y 2 and of supramolecular complex 3 obtained with the 321-G base.

| | 321-G base | |
|---|---|---|
| Compound or Complex | Total energy (kJ/moL) | Interaction Energy (kJ/moL) |
| 1 | −2,450,677.36 | |
| 2 | −1,887,922.90 | |
| 3 | −4,338,844.63 | −244.37 |

Wherein:

1 = sodium but-2-en-1-sulfonate

2 = ethyl-amido-propyl-betaine

3 = Supramolecular complex derived from the interaction between sodium but-2-en-1-sulfonate and ethyl-amidopropyl-betaine The analysis of table 2 results shows that the formation of supramolecular complex 3 from compounds 1 and 2 interactions is strongly favored from a thermodynamic point of view. Furthermore, the −244.1 kj/moL interaction energy indicates the presence of ion-ion-type supramolecular interactions, or a combination of ion-dipole and hydrogen bonds interactions.

The analysis of Table 3 results shows that the 2.289, 2.248, 2.282 and 2.311 Å distances for the O1•••Na1, O2•••Na1, O5•••Na1 and O6•••Na1 interactions are lower than the Van der Waals Radiuses sum for the oxygen (Van der Waals Radius of 1.40 Å) and sodium atoms (Van der Waals Radius of 2.31 Å) and are typical from structures containing coordination bonds Na—O and sulfonate groups (*Crystal Growth & Design* 2006, 6[2], 514-518) or carbonyl groups (*Green Chemistry* 2005, 7, 716-720). Moreover, the 1.991 and 2.277 Å bonding distances for the H3A•••O6 and H4A•••O4 interactions show the presence of two strong hydrogen bonds, which, together with the coordination bonds formed by the sodium atom are responsible for the formation of supramolecular complex 3. Additionally, the 2.490 Å bonding distance for the H11A•••O3 interaction indicates the presence of a supramolecular interaction between the alpha olefin sulfonates allylic protons and the alkyl amido propyl betaine group oxygen atom.

TABLE 3

Main bonding distances in compounds 1, 2 and in supramolecular complex 3.

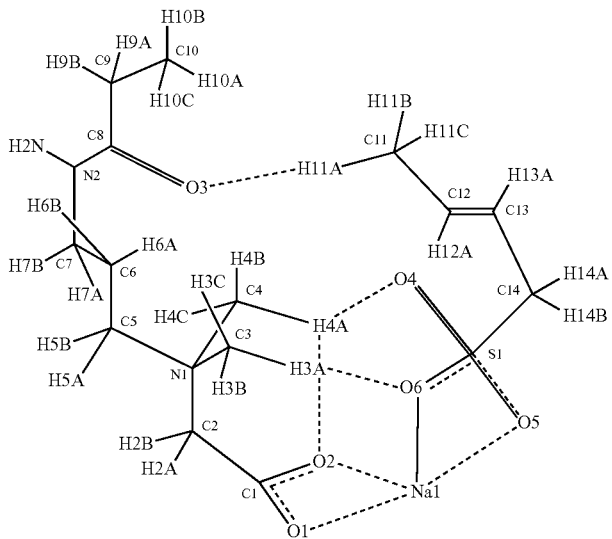

| Bond or interaction distance | Compound or complex bonding distance (Å) | | |
| --- | --- | --- | --- |
| | 1 | 2 | 3 |
| O1----Na1 | | | 2.289 |
| O2---Na1 | | | 2.248 |
| O5---Na1 | 2.161 | | 2.282 |
| O6---Na1 | 2.164 | | 2.311 |
| H3A---O6 | | | 1.991 |
| H4A---O4 | | | 2.277 |
| H11A---O3 | | | 2.490 |
| C1====O1 | | 1.242 | 1.251 |
| C1====O1 | | 1.244 | 1.254 |
| S1—O4 | 1.570 | | 1.576 |
| S1—O6 | 1.603 | | 1.602 |
| S1—O5 | 1.602 | | 1.595 |

Wherein:

1 = sodium but-2-en-1-sulfonate

2 = ethyl-amido-propyl-betaine

3 = Supramolecular complex derived from the interaction between sodium but-2-en-1-sulfonate y ethyl-amido-propyl-betaine

TABLE 4

Mulliken atomic charges of compounds 1, 2 and supramolecular complex 3.

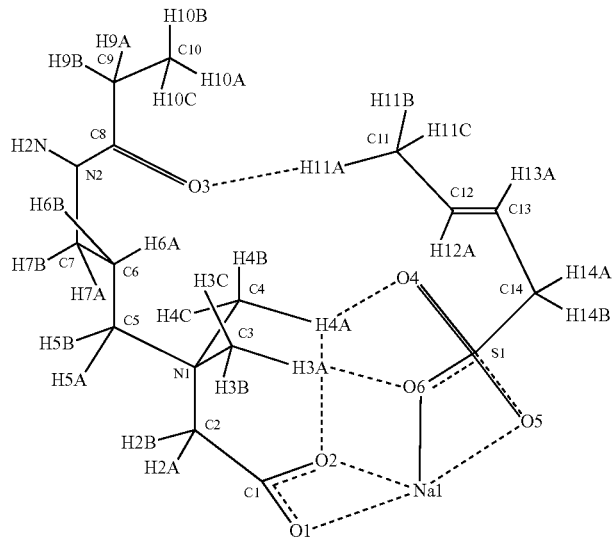

| Atom | Compound or complex atomic charge (e) | | |
|---|---|---|---|
| | 1 | 2 | 3 |
| C1 | | 0.846 | 0.844 |
| C2 | | −0.317 | −0.284 |
| C3 | | −0.427 | −0.506 |
| C4 | | −0.424 | −0.428 |
| C5 | | −0.176 | −0.188 |
| C6 | | −0.479 | −0.477 |
| C7 | | −0.144 | −0.158 |
| C8 | | 0.895 | 0.910 |
| C9 | | −0557 | −0.550 |
| C10 | | −0.567 | −0.579 |
| C11 | −0.634 | | −0.660 |
| C12 | −0.206 | | −0.184 |
| C13 | −0.233 | | −0.238 |
| C14 | −0.833 | | −0.879 |
| O1 | | −0.720 | −0.714 |
| O2 | | −0.723 | −0.710 |
| O3 | | −0.645 | −0.648 |
| O4 | −0.733 | | −0.760 |
| O5 | −0.828 | | −0.792 |
| O6 | −0.833 | | −0.816 |
| N1 | | −0.748 | −0.747 |
| N2 | | −0 − 909 | −0.906 |
| Na1 | 0.678 | | 0.528 |
| S1 | 1.895 | | 1.897 |
| H2A | | 0.252 | 0.265 |
| H2B | | 0.248 | 0.265 |
| H3A | | 0.337 | 0.381 |
| H3B | | 0.245 | 0.234 |
| H3C | | 0.231 | 0.287 |
| H4A | | 0.340 | 0.373 |
| H4B | | 0.228 | 0.245 |
| H4C | | 0.233 | 0.227 |
| H5A | | 0.261 | 0.258 |
| H5B | | 0.248 | 0.249 |
| H11A | | 0.231 | 0.264 |
| H12A | 0.262 | | 0.236 |
| H13A | 0.250 | | 0.257 |
| H14A | 0.298 | | 0.290 |
| H14B | 0.304 | | 0.297 |

Wherein:
1 = sodium but-2-en-1-sulfonate
2 = ethyl-amido-propyl-betaine
3 = Supramolecular complex derived from the sodium but-2-en-1-sulfonate and ethyl-amido-propyl-betaine interaction The analysis of Table 4 results shows that the Mulliken atomic charge on supramolecular complex 3 sodium atom Na1 is reduced by 0.15 units with respect to the charge that this atom has in the sodium alpha olefin sulfonate compound 1, whereas oxygen atoms O1 and O2 atomic charges undergo a 0.006 and 0.013 units decrease, with respect to those in alkyl amidopropyl betaine 2. This significant change in the Mulliken atomic charges confirms that in supramolecular complex 3, the Na1 sodium atom is coordinated with oxygen atoms O1 and O2.

Additionally, the Mulliken atomic charge on supramolecular complex 3 hydrogen atoms H3A and H4A increases by 0.027 and 0.033 units, respectively, with respect to the charges shown by these atoms in alkyl amidopropyl betaine compound 2, whereas oxygen atom O4 Mulliken atomic charge undergoes a 0.0027 units increase, and that of oxygen atom O6 undergoes a 0.017 decrease, with respect to sodium alpha olefin sulfonate compound 1. This significant change in the Mulliken atomic charges confirms the occurrence of non-conventional hydrogen bonds in supramolecular complex 3, which are widely recognized for generating an energetic stabilization maximum level in supramolecular complexes (*Account Chemical Research*, 1996, 29, 441-449 and *Crystal Growth & Design*, 2003, 3, 239-246).

In order to establish the effect of the length of the alkyl amido propyl betaines and sodium alpha olefin sulfonates hydrophobic chains on the stability of the supramolecular complexes formed, by means of computational chemistry, and using the sodium hept-2-en-1-sulfonate (sodium alpha olefin sulfonate) 4 and propyl-amido-propyl-betaine (alkyl amidopropyl betaine) 5 interaction, supramolecular complex 6 was designed (6).

(6)

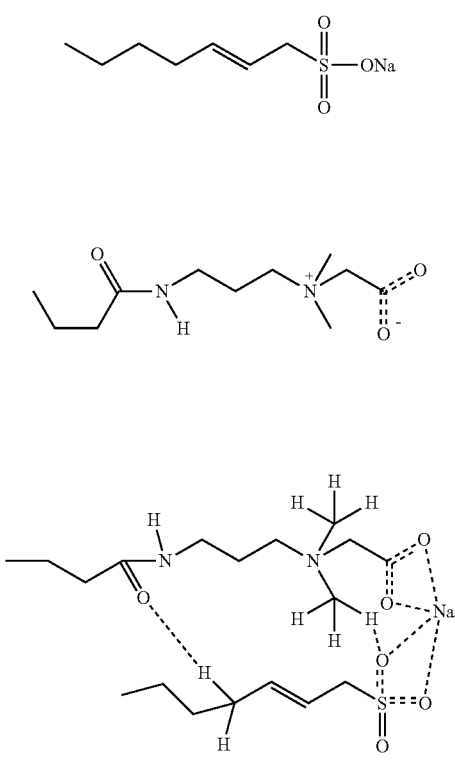

Tables 5 and 6 show the energetic results and the main bonding distances for compounds 4, 5 and supramolecular complex 6.

TABLE 5

Energy of compounds 4, 5 and supramolecular complex 6 obtained with the 321-G base.

| | 321-G Base | |
|---|---|---|
| Compound or Complex | Total energy (kJ/moL) | Interaction Energy (kJ/moL) |
| 4 | −2,756,145.74 | |
| 5 | −1,989,745.37 | |
| 6 | −4,746,129.56 | −238.45 |

Wherein:

4 = sodium hept-2-en-1-sulfonate

5 = propyl-amido-propyl-betaine

6 = Supramolecular complex derived from the sodium hept-2-en-1-sulfonate and propyl-amido-propyl-betaine interaction.

The analysis of table 5 results shows that the formation of supramolecular complex 6 from the interaction between compounds 4 and 5 is strongly favored from a thermodynamic point of view. Additionally, the −238.45 kj/moL interaction energy is in the same order of magnitude as the one obtained for supramolecular complex 3; hence, we can infer that the supramolecular complexes' hydrophobic part does not contribute significantly to the thermodynamic stability thereof, and that it mainly impacts on the solubility properties and the capability of generating the maximum amounts of foam at a lesser concentration of the supramolecular complexes (critical micelle concentration).

The analysis of Table 6 results shows that the bonding distances obtained for O1•••Na1, O2•••Na1, O5•••Na1, O6•••Na1, H3A•••O6, H4A•••O4 and H15A•••O3 interactions are in the same order of magnitude than those obtained for supramolecular complex 6, thus confirming that the hydrophobic moiety does not significantly contribute to the stability of the supramolecular obtained from the interaction between sodium alpha olefin sulfonate and alkyl amido propyl betaines.

2) Supramolecular Complexes Synthesis

The supramolecular complexes derived from the present invention are obtained according to the synthesis procedure (7), which consists in mixing, at room temperature and atmospheric pressure, sodium alpha olefin sulfonates 7 with alkyl amidopropyl betaines 8. The molar ratio at which the supramolecular complexes are formed from the sodium alpha olefin sulfonates with alkyl amido propyl betaines interaction ranges from 1 to 2 or from 2 to 1, with the molar ratio 1 to 1 being preferred.

TABLE 6
Main bonding distances in compounds 4, 5 and in supramolecular compound 6.
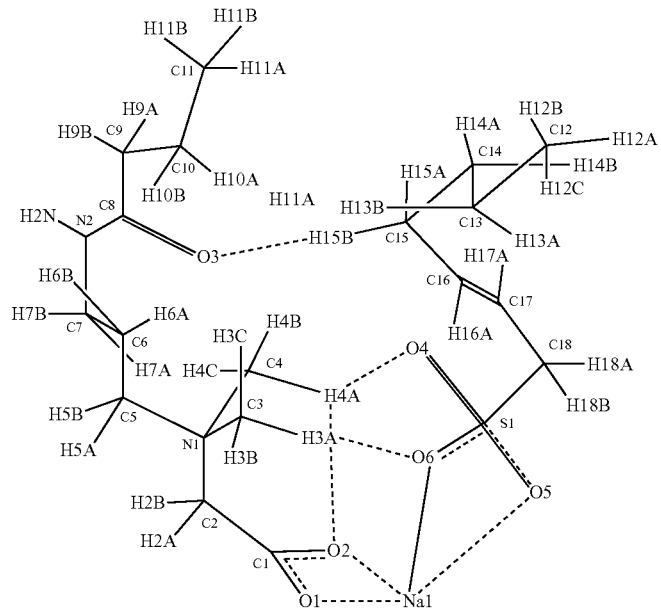
| Bond or interaction distance | Compound or complex bonding distance (Å) | | |
|---|---|---|---|
| | 1 | 2 | 3 |
| O1----Na1 | | | 2.295 |
| O2---Na1 | | | 2.248 |
| O5---Na1 | 2.11 | | 2.298 |
| O6---Na1 | 2.164 | | 2.298 |
| H3A---O6 | | | 1.967 |
| H4A---O4 | | | 2.309 |
| H15B---O3 | | | 2.577 |
| C1====O1 | | 1.242 | 1.251 |
| C1====O2 | | 1.244 | 1.254 |
| S1—O4 | 1.570 | | 1.576 |
| S1—O6 | 1.603 | | 1.598 |
| S1—O5 | 1.602 | | 1.594 |
Wherein:
1 = sodium but-2-en-1-sulfonate
2 = ethyl-amido-propyl-betaine
3 = Supramolecular complex derived from the sodium but-2-en-1-sulfonate and ethyl-amido-propyl-betaine.

(i)

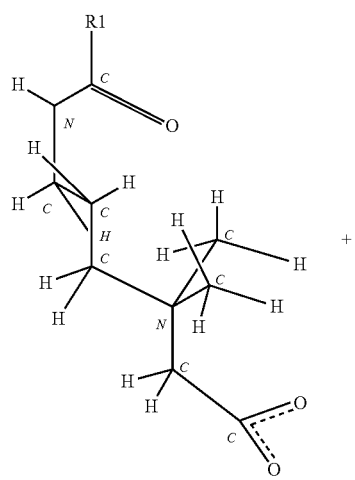

Alkyl amido propyl betaine

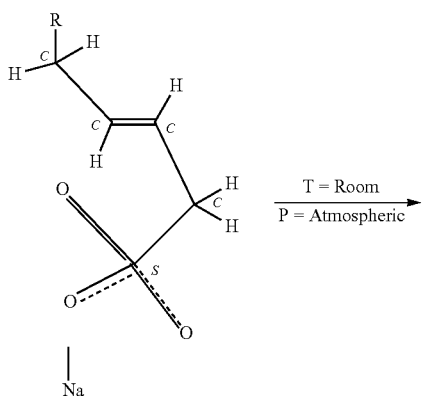

Sodium alpha olefin sulfonate

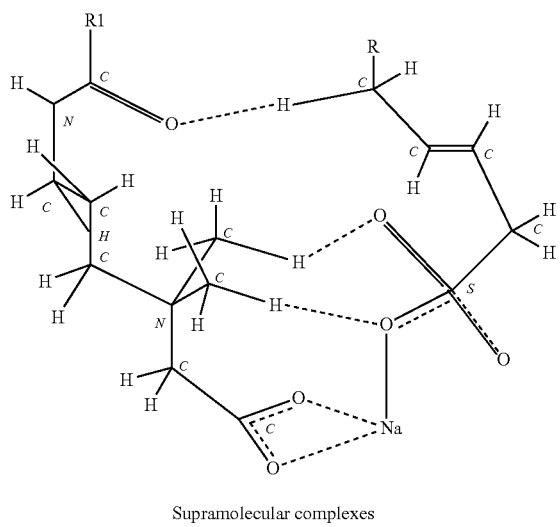

Supramolecular complexes

The formation of the supramolecular complexes from the mixture of sodium alpha olefin sulfonates with alkyl amido propyl betaines may be carried out in water, alcohols or a water-alcohols mixture, with the aqueous medium being preferred. The supramolecular complexes final concentration by weight can range from 0.1% to 50%, preferably within the range of 20% to 50%.

The sodium alpha olefin sulfonates useful for the present invention include sodium but-2-en-1-sulfonate, sodium pent-2-en-1-sulfonate, sodium hex-2-en-1-sulfonate, sodium hept-2-en-1-sulfonate, sodium oct-2-en-1-sulfonate, sodium non-2-en-1-sulfonate, sodium dec-2-en-1-sulfonate, sodium undec-2-en-1-sulfonate, sodium dodec-2-en-1-sulfonate, sodium tetradec-2-en-1-sulfonate, sodium hexadec-2-en-1-sulfonate and the mixture of one or more of said sodium alpha olefin sulfonates. The alkyl amido propyl betaines that are useful for the present invention include ethyl-amydo-propyl-betaine, propyl-amido-propyl-betaine, butyl-amido-propyl-betaine, pentyl-amido-propyl-betaine, hexyl-amido-propyl-betaine, heptyl-amido-propyl-betaine, octyl-amido-propyl-betaine, nonyl-amido-propyl betaine, decyl-amido-propyl betaine, undecyl-amido-propyl betaine, coco-amido-propyl betaine and mixtures of two or more of these alkyl amido propyl betaines.

The following examples will serve to illustrate the synthesis of the two supramolecular complexes that are the subject matter of the present invention, whose formulas and chemical nature are also detailed below (Examples 1 and 2), and below we also detail the composition and effectiveness of said that, briefly, consist in the combination supramolecular complexes derived from the interaction between sodium olefin sulfonates and alkyl amido propyl betaines with: anionic surfactants (Example 7) itaconic acid-derived oligomers (Example 8), acrylamide and acrylic acid-derived copolymers (Example 9), itaconic acid-derived oligomers and acrylamide and acrylic acid-derived copolymers (Example 10), cationic surfactants (Example 12), cationic surfactants and itaconic acid-derived oligomers (Example 13), etc. Additionally, examples are shown were these are used together with different gases in order to generate the foam.

EXAMPLE 1

Synthesis of supramolecular complexes 9 resulting from the interaction between sodium dodec-2-en-1-sulfonate 10 and coco-amido-propyl betaine 11.

In a 1000 mL two-neck round bottom flask, equipped with a magnetic stirrer and a thermometer, 300 grams of an aqueous solution containing 30.4% by weight (0.2719 moL) of coco-amido-propyl-betaine 11 and 200 grams of an aqueous solution containing 33.8% by weight (0.2719) of sodium dodec-2-en-1-sulfonate 10 were mixed at room temperature and atmospheric pressure, stirring vigorously. The mixture was stirred vigorously for 3 hours and then the solvent was evaporated, yielding 158.4 grams of a dark brownish doughy solid containing the supramolecular complexes 9 (whose structural formula is shown in (8), where R is radical —$C_8H_{17}$ y $R_1$ which is constituted by a group of radicals comprising —$C_{11}H_{23}$, —$C_9H_{19}$ y $C_7H_{15}$).

(8)

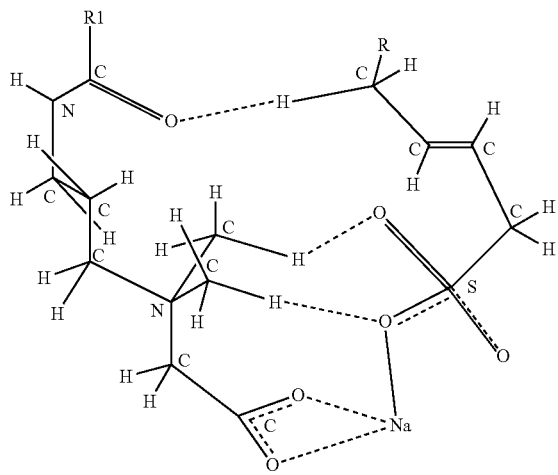

EXAMPLE 2

Synthesis of supramolecular complexes 12 resulting from the interaction of sodium tetradec-2-en-1-sulfonate 13 and sodium hexadec-2-en-1-sulfonate 14 with coco-amido-propyl betaine 11.

In a 1000 mL two-neck round bottom flask, equipped with a magnetic stirrer and a thermometer, 300 grams of a solution containing 50.0% by weight of water, 16.6% by weight of ethanol and 31.7% by weight (0.2836 moL) of coco-amido-propyl-betaine 11 were mixed at room temperature and atmospheric pressure, stirring vigorously, with 200 grams of an aqueous solution containing 28.2% by weight (0.2041 moL) of sodium tetradec-2-en-1-sulfonate 13 and 12.1% by weight (0.0795 moL) of sodium hexadec-2-en-1-sulfonate 14. The mixture was stirred vigorously for 3 hours, and then the solvent was evaporated, yielding 174.4 grams of supramolecular complexes 12 (whose structural formula is shown in (9), wherein R is constituted by a group of radicals comprising —$C_{10}H_{21}$ and —$C_{12}H_{25}$, and $R_1$ is constituted by a group of radicals comprising —$C_{11}H_{23}$, —$C_9H_{19}$ y —$C_7H_{15}$) as a dark brownish doughy solid.

(9)

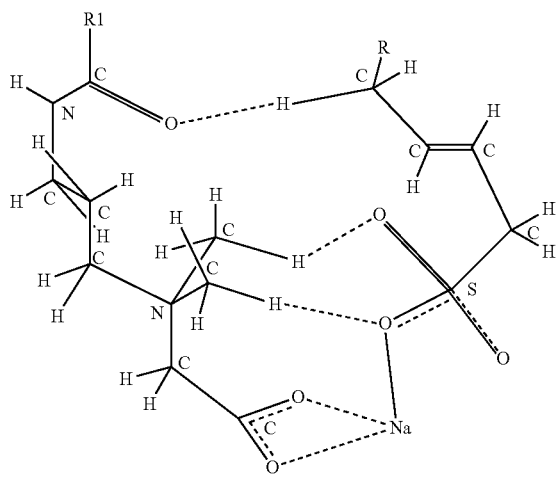

3) Supramolecular Complexes Spectroscopic Characterization

EXAMPLE 3

Spectroscopic characterization of sodium dodec-2-en-1-sulfonate 10 and coco-amido-propyl-betaine 11 interaction-derived supramolecular complexes 9 by $^1$H and $^{13}$C Nuclear Magnetic Resonance and Infrared Spectroscopy.

In the $^1$H nuclear magnetic resonance spectrum of supramolecular complexes 9 (10) obtained in deuterated water, the following characteristic signals are observed: 1) a single signal for methylic protons H3 and H4 at 3.06 ppm and 2) a single signal for methylenic protons H2 at 3.71 ppm; whereas in the $^1$H nuclear magnetic resonance spectrum of coco-amido-propyl betaine 11 a single signal is observed for methylic protons H3 and H4 at 3.01 ppm and the single signal for the methylenic protons H2 at 3.66 ppm. The lack of protection suffered by the methylic protons H3 and H4 and methylenic protons H2 in supramolecular complexes 9 with respect to those in coco-amido-propyl betaine 11 indicates the presence of interactions that generate the supramolecular complexes.

(10)

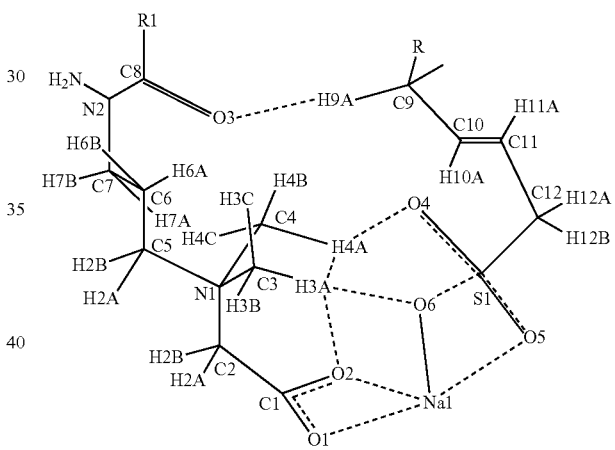

The following characteristic signals are observed in the supramolecular complexes $^{13}$C nuclear magnetic resonance spectrum: 1) a main single signal for the amido carbonyl group carbon C8 at 175.9 ppm, 2) a main simple signal for the carbonyl group carbon C1 of sodium salt at 169.3 ppm, 3) two main simple signals for the alkenylic carbon C10 at 138.1 and 13.6.0 ppm, 4) two main simple signals for the alkenylic carbon C11 at 119.7 and 119.2 ppm, 5) three main simple signals for methylenic carbons C5 at 64.0, 63.1 and 62.5 ppm, 6) a main simple signal for methylenic carbon C12 at 55.0 ppm, 7) a simple signal for methylic carbons C3 and C4 at 50.9 ppm and 8) a simple signal for methylenic carbon C9 at 36.2 ppm. A comparison of the chemical shifts obtained in the supramolecular complexes 9 $^{13}$C nuclear magnetic resonance spectrum with those obtained in the coco-amido-propyl betaine 11 and sodium dodec-2-en-1-sulfonate 10 $^{13}$C nuclear magnetic resonance spectra, shows the following: 1) the main simple signals for the carbonyl carbons C8 and C9 are observed in the supramolecular complexes 9 $^{13}$C spectrum at 175.9 and 169.3 ppm, whereas in the coco-amidopropyl betaine 11 $^{13}$C spectrum these are observed at 175.8 and 168.8 ppm, 2) the main simple signals for alkenylic carbons C10 and C11 are observed in the supramolecular complexes 9 $^{13}$C spectrum at 138.1, 136.0, 119.7 and 119.2 ppm, whereas in the dodec-2-en-1-sodium sulfonate 10 $^{13}$C spectrum these are observed at 138.7, 136.6, 119.2 and 118.6 ppm, 3) the main simple signals for methylenic carbons C5 are observed in the supramolecular complexes 9 $^{13}$C spectrum at 64.0, 63.1 and 62.5 ppm, whereas in the coco-amido-propyl betaine 11 $^{13}$C spectrum these are observed at 63.9, 62.6 and 62.1 ppm, 4) a main simple signal for methylenic carbon C12 is observed in the supramolecular complexes 9 $^{13}$C spectrum at 55.0 ppm, whereas in the sodium dodec-2-en-1-sulfonate 10 $^{13}$C spectrum it is observed at 54.9 ppm, 5) a main single simple for methylic carbons C3 and C4 is observed in the supramolecular complexes 9 $^{13}$C spectrum at 50.9 ppm, whereas in the coco-amido-propyl betaine 11 $^{13}$C spectrum it is observed at 51.4 ppm, 6) a main simple signal for methylenic carbon C9 is observed in the supramolecular complexes 9 $^{13}$C spectrum at 36.2 ppm, whereas in the sodium dodec-2-en-1-sulfonate 10 $^{13}$C spectrum it is observed at 36.9 ppm. The lack of protection suffered by carbon atoms C8, C1 and C5, as well as the protection underwent by carbon atom C3 in the supramolecular complexes 9 compared to coco-amido-propyl betaine 11 clearly demonstrates the existence of interactions generating supramolecular complexes 9.

Furthermore, the lack of protection suffered by carbon atoms C10 and C12 and the protection underwent by carbon atoms C11 and C9 in the supramolecular complexes 9 compared to sodium dodec-2-en-1-sulfonate 10 confirms the presence of the same 9.

The following main vibrational bands are observed on the supramolecular complexes 9 infrared spectrum obtained in KBr pellet: 1) an intense tension wide band at 1638 cm$^{-1}$, assigned to the amido carbonyl group vibration, overlapping with the sodium salt amido carbonyl group vibrational band, 2) an asymmetric intense tension wide band at 1191 cm$^{-1}$ and a symmetric middle-intensity tension band at 1067 cm$^{-1}$, both assigned to the sulfonate group vibration, 3) A low-intensity flexion band at 615 cm$^{-1}$, assigned to the carbonyl group vibration.

4) Experimental Evaluation of the Supramolecular Complexes Foaming Properties

The evaluation of the foam generation and gas piping control capacity in naturally fractured systems by the sodium alpha olefin sulfonates and alkyl amido propyl betaines interaction-derived supramolecular complexes subject matter of the present invention, was performed using three different tests: I) Foam stability measurement at atmospheric pressure conditions (Foaming test at atmospheric pressure), II) Foam stability measurement at high-pressure conditions (Foaming test at high-pressure) and III) Measurement of the capacity of the foam to control the piping of gas in naturally fractured systems at high pressure and temperature (Gas piping control test).

I) Foaming Test at Atmospheric Pressure

The system for the generation of foam at atmospheric pressure was designed to assess the stability of foams generated by surfactants at temperatures up to 100° C.

The foam generation system (FIG. 1. Scheme of the foam generation system, which allows for the foam stability to be assessed at atmospheric pressure and at up to 100° C.) comprises the following elements: 1) gas tank (GT), 2) foam meter (FM), 3) flow-meter (F) 4) thermal bath (TB), 5) Video camera (VC), 6) Image-capturing system (ICS), 7) Flow control valve (FCV), 8) Three-way valve (TWV) and 9) Valve.

The core device of the system is the glass foam-meter, which is constituted by two concentric tubes. The outer column is 1.31 m high with a 0.0762 m diameter, and it has a 1.15 m high, 0.0508 diameter tube installed within. The outer column is charged with the solution to be evaluated (brine plus surfactant) and the spear with the sintered diffuser (which can be made out of metal or glass) is set at its center, through which the gas from the tank is injected and diffused in the surfactant-containing liquid by means of the disperser attached at its bottom end. The gas flow-regulating unit comprises three valves; a shut-off valve, a flow control valve and a three-way valve, which are connected to a flow-meter (maximum flow of 3 sfc/h) and the temperature control within the annular space is performed by means of digital circulation thermal bath.

In order to carry out the assessment of the foam stability and its foaming capacity, a procedure was developed, consisting of the following 11 steps: 1) Preparing the study solution at the concentration required by the analysis, 2) Checking the cleanness of the cell, 3) Removing the glass or steel spear from the foam generation cell, 4) Injecting 60 ml of the solution to be studied using a 20 ml glass syringe and a tube, 5) Introducing and centering the glass or steel spear, 6) Recording the liquid level initial reading, 7) Letting the gas flow for a minute at a 0.25 scf/h rate, 8) Shutting-off the gas inlet and measuring the foam's maximum height and the level of the liquid, 9) Depending on the foam disappearance rate, the time interval at which the readings must be recorded is established, 10) At each time-step, the foam height and the level of the liquid are to be read (FIG. 2. Readings to be recorded during the foam stability test, where: TH=Total height; FH=Foam height and LH=Liquid height), 11) Determining the foam stability % at each step.

When the foam is observed to break at any point of its structure, the stop-watch is stopped and total time is recorded.

The foam stability is defined as the variation of the initial height of the foam over time (FIG. 3. Necessary readings for the calculation of the foam stability) and it is determined according to equation 1.

$$\text{Foam stability} = 100 - \left(\frac{A_1(t)}{A_1(0) + A_2(0)}\right) * 100 \qquad \text{Equation 1}$$

Wherein:

$A_1(t) = $

Foam height at each $t$ time selected for measurement $A_1(0) = $ Initial gas height to induce the foam $A_2(0) = $ Initial foam height

EXAMPLE 4

Stability determination of the foam generated by sodium dodec-2-en-1-sulfonate 10 and coco-amido-propyl-betaine 11 interaction-derived supramolecular complexes 9.

The stability of the foam generated by sodium dodec-2-en-1-sulfonate 10 and coco-amido-propyl-betaine 11 interaction-derived supramolecular complexes 9 was assessed through the Foaming test at atmospheric pressure, at a 75° C. temperature, using a brine containing 120000 ppm, out of which 5323 ppm corresponded to divalent ions (Calcium and Magnesium), a 1% by weight concentration of supramolecular complexes 9 and nitrogen ($N_2$) as gas.

The established time for the attainment of each parameter (foam and liquid height) was two minutes and the minimum foam stability percentage recorded was 30%.

The stability ratio of the foam obtained with supramolecular complexes 9 over time is shown in FIG. 4 (Stability performance over time, at 1 kg/cm² and 75° C., of the foam prepared with brine at 1% by weight of supramolecular complexes 9), and the 30% minimum stability is observed to be reached in 155 minutes.

In order to demonstrate that supramolecular complexes 9 show great advantages when used as foaming agents over the components used as raw materials for its formation, the foam stability generated by sodium dodec-2-en-1-sulfonate 10 and coco-amido-propyl betaine 11 was determined under the same experimental conditions mentioned in example 4.

EXAMPLE 5

Stability determination of the foam generated by sodium dodec-2-en-1-sulfonate 10.

The foam stability results obtained in the foaming test at atmospheric pressure and at a 1% by weight concentration of sodium dodec-2-en-1-sulfonate 10 are shown in FIG. 5 (Stability performance over time, at 1 kg/cm² and 75° C., of the foam prepared with brine at 1% by weight of sodium dodec-2-en-1-sulfonate 10) and the analysis of the results indicates that the minimum 30% stability is achieved in 55 minutes.

EXAMPLE 6

Stability determination of the foam generated by coco-amido-propyl betaine 11.

The foam stability results obtained in the foaming test at atmospheric pressure and at a 1% by weight concentration of coco-amido-propyl betaine 11 are shown in FIG. 6 (Stability performance over time, at 1 kg/cm² and 75° C., of the foam prepared with brine at 1% by weight of coco-amido-propyl betaine 11) and the analysis of the results indicates that the minimum 30% stability is achieved in 35 minutes.

A comparison of the stability results obtained with foam generated by sodium dodec-2-en-1-sulfonate 10 and coco-amido-propyl betaine 11 interaction-derived supramolecular complexes 9, sodium dodec-2-en-1-sulfonate 10 and coco-amido-propyl betaine 11 (FIG. 7. Stability over time, at 1 kg/cm² and 75° C., of the foams generated by different chemical products (supramolecular complexes 9, sodium dodec-2-en-1-sulfonate 10 and coco-amido-propyl betaine 11) at 1% by weight) indicates that the foam generated by supramolecular complexes 9 is 2.8-fold more stable than the one generated by sodium dodec-2-en-1-sulfonate 10 and 4.4-fold more stable than the one generated by coco-amido-propyl betaine 11, with these results demonstrating in a novel fashion the advantage of using the supramolecular complexes 9 derived from the interaction of sodium dodec-2-en-1-sulfonate 10 and coco-amido-propyl betaine 11 as foaming agents at atmospheric pressure, elevated temperature and high concentrations of total solids and divalent ions.

EXAMPLE 7

In order to establish the effect of adding anionic surfactants on the stability of the foam generated with sodium dodec-2-en-1-sulfonate 10 and coco-amido-propyl betaine 11 interaction-derived supramolecular complexes 9, a formulation A was prepared consisting of 88% by weight of supramolecular complexes 9, 6% by weight of an anionic surfactant of the sodium 3-hydroxy-dodecil-sulfonate 15 type and 6% of coco-amido-propyl betaine 11. The stability of formulation A was assessed using the foaming test at atmospheric pressure, at a temperature of 75° C., using a brine containing 120000 ppm total solids, with 5323 corresponding to divalent ions (Calcium and Magnesium), a 1% by weight concentration of formulation A and nitrogen ($N_2$) as gas.

The foam stability results obtained in the foaming test at atmospheric pressure and at a 1% by weight concentration of formulation A are shown in FIG. 8 (Stability performance over time, at 1 kg/cm² and 75° C., of the foam prepared with brine at 1% by weight of formulation A), and the analysis of the results indicates that the 30% minimum stability is reached in 140 minutes.

EXAMPLE 8

In order to establish the effect of adding itaconic acid-derived oligomers on the stability of foam generated with sodium dodec-2-en-1-sulfonate 10 and coco-amido-propyl betaine 11 interaction-derived supramolecular complexes 9, a formulation B was prepared, consisting of 95.2% by weight of supramolecular complexes 9 and 4.8% by weight of Poly (itaconic acid) 16 with an average molecular weight value of 1100 Dalton. The stability of formulation B was evaluated by means of the foaming test at atmospheric pressure, at a temperature of 75° C., using a brine containing 120000 ppm total solids, out of which 5323 ppm corresponded to divalent ions (Calcium and Magnesium), a 1% by weight concentration of formulation B and nitrogen ($N_2$) as gas.

The foam stability results obtained in the foaming test at atmospheric pressure and at a 1% by weight concentration of formulation B are shown in FIG. 9 (Stability performance over time, at 1 kg/cm² and 75° C., of the foam prepared with brine at 1% by weight of formulation B), and the analysis of the results indicates that the 30% minimum stability is reached in 220 minutes.

EXAMPLE 9

In order to establish the effect of adding partially hydrolyzed poly(acrylamide)-derived gels on the stability of foam generated with sodium dodec-2-en-1-sulfonate 10 and coco-amido-propyl betaine 11 interaction-derived supramolecular complexes 9, a formulation C was prepared, consisting of 91% by weight of supramolecular complexes 9 and 9% by weight of partially hydrolyzed Poly(acrylamide) 17. The stability of formulation C was evaluated by means of the foaming test at atmospheric pressure, at a temperature 75° C., using a brine containing 120000 ppm total solids, out of which 5323 ppm corresponded to divalent ions (Calcium and Magnesium), a 1% by weight concentration of formulation C and nitrogen ($N_2$) as gas.

The foam stability results obtained in the foaming test at atmospheric pressure and at a 1% by weight concentration of formulation C are shown in FIG. 10 (Stability performance over time, at 1 kg/cm² and 75° C., of the foam prepared with brine at 1% by weight of formulation C), and the analysis of the results indicates that the 30% minimum stability is reached in 600 minutes.

EXAMPLE 10

In order to establish the effect of adding itaconic acid-derived oligomers and partially hydrolyzed poly(acrylamide)-derived gels on the stability of foam generated by sodium dodec-2-en-1-sulfonate 10 and coco-amido-propyl betaine 11 interaction-derived supramolecular complexes 9, a formulation C was prepared, consisting of 87% by weight of supramolecular complexes 9, 8.7% by weight of partially hydrolyzed Poly(acrylamide) 17 and 4.3% by weight of Poly (itaconic acid) 16. The stability of formulation D was evaluated by means of the foaming test at atmospheric pressure, at a 75° C. temperature, using a brine containing 120000 ppm total solids, out of which 5323 ppm corresponded to divalent ions (Calcium and Magnesium), a 1% by weight concentration of formulation D and nitrogen ($N_2$) as the gas.

The foam stability results obtained in the foaming test at atmospheric pressure and at a 1% by weight concentration of formulation D are shown in FIG. 11 (Stability performance over time, at 1 kg/cm$^2$ and 75° C., of the foam prepared with brine at 1% by weight of formulation D), and the analysis of the results indicates that the 30% minimum stability is reached in 680 minutes.

FIG. 12 (Stability over time, at 1 kg/cm$^2$ and 75° C., of the foams generated by different chemical products (formulation A, formulation B, formulation C and formulation D) at 1% by weight) shows a comparison of the stability results obtained with foam generated by formulation A, formulation B, formulation C and formulation D, indicating that the foam generated by formulation D is 1.13-fold more stable than the one generated by formulation C, 3-fold more stable than the one generated by formulation B and 4.9-fold more stable than the one generated by formulation A, with these results demonstrating in a novel fashion the advantage of using itaconic acid-derived oligomers and/or partially hydrolyzed poly (acrylamide)-derived gels together with supramolecular complexes 9 as foaming agents at atmospheric pressure, high temperature and high concentrations of total solids, divalent ions and nitrogen as gas to generate the foam.

EXAMPLE 11

Stability determination of the foam generated by sodium dodec-2-en-1-sulfonate 10 and coco-amido-propyl betaine 11 interaction-derived supramolecular complexes 9, evaluated by means of the foaming test at atmospheric pressure, at a 75° C. temperature, using a brine containing 38000 ppm total solids, out of which 6800 ppm corresponded to divalent ions (Calcium and Magnesium), a 1% by weight concentration of supramolecular complex 9 and methane ($CH_4$) as the gas.

The foam stability results obtained on the foaming test at atmospheric pressure and at a 1% by weight concentration of supramolecular complexes 9 are shown in FIG. 13 (Stability performance over time, at 1 kg/cm$^2$ and 75° C., of the foam prepared with brine at 1% by weight of supramolecular complexes 9 ), and the analysis of the results indicates that the 30% minimum stability is reached in 90 minutes.

EXAMPLE 12

In order to establish the effect of adding cationic surfactants on the stability of foam generated with methane gas and sodium dodec-2-en-1-sulfonate 10 and coco-amido-propyl betaine 11 interaction-derived supramolecular complexes 9, a formulation E was prepared, consisting of 91% by weight of supramolecular complexes 9 and 4.5% by weight of a cationic surfactant of the dodecyl-trimethyl-ammonium chloride 18 type and 4.5% by weight of coco-amido-propyl betaine 11. The stability of formulation E was evaluated by means of the foaming test at atmospheric pressure, at a temperature of 75° C., using a brine containing 38000 ppm total solids, out of which 6800 ppm corresponded to divalent ions (Calcium and Magnesium), a 1% by weight concentration of formulation E and methane ($CH_4$) as gas.

The foam stability results obtained on the foaming test at atmospheric pressure and at a 1% by weight concentration of formulation E are shown in FIG. 14 (Stability performance over time, at 1 kg/cm$^2$ and 75° C., of the foam prepared with brine at 1% by weight of formulation E), and the analysis of the results indicates that the 30% minimum stability is reached in 93 minutes.

EXAMPLE 13

In order to establish the effect of adding cationic surfactants and itaconic acid-derived oligomers on the stability of foam generated with methane gas and sodium dodec-2-en-1-sulfonate 10 and coco-amido-propyl betaine 11 interaction-derived supramolecular complexes 9, a formulation F was prepared, consisting of 87% by weight of supramolecular complex 9, 4.4% by weight of dodecil-trimethyl-ammonium chloride 18, 4.3% by weight of coco-amido-propyl betaine 11 and 4.3% by weight of Poly(itaconic acid) 16 with an average molecular weight value of 1100 Dalton. The stability of formulation F was evaluated by means of the foaming test at atmospheric pressure, at a temperature of 75° C., using a brine containing 38000 ppm total solids, out of which 6800 ppm corresponded to divalent ions (Calcium and Magnesium), a 1% by weight concentration of formulation E and methane ($CH_4$) as gas.

The foam stability results obtained on the foaming test at atmospheric pressure and at a 1% by weight concentration of formulation F are shown in FIG. 15 (Stability performance over time, at 1 kg/cm$^2$ and 75° C., of the foam prepared with brine at 1% by weight of formulation F), and the analysis of the results indicates that the 30% minimum stability is reached at a time of 150 minutes.

FIG. 16 (Stability over time, at 1 kg/cm$^2$ and 75° C., of foams generated by different chemical products (supramolecular complexes 9, formulation E and formulation F) at 1% by weight) shows a comparison of the stability results obtained with foam generated by dodec-2-en-1-sodium sulfonate 10 and coco-amido-propyl betaine 11 interaction-derived supramolecular complexes 9, formulation E and formulation F, indicating that the foam generated by formulation F is 1.6-fold more stable than the one generated by formulation E and 1.7-fold more stable than the one generated by supramolecular complexes 9, with these results demonstrating in a novel fashion the advantage of using cationic surfactants of the alkyl ammonium quaternary salts type and/or itaconic acid-derived oligomers together with supramolecular complexes 9 as foaming agents at atmospheric pressure, high temperature, high concentrations of total solids, divalent ions and nitrogen as gas to generate the foam.

EXAMPLE 14

Stability determination of the foam generated by sodium dodec-2-en-1-sulfonate 10 and coco-amido-propyl betaine 11 interaction-derived supramolecular complexes 9 evaluated by means of the foaming test at atmospheric pressure, at a temperature of 75° C., using a brine containing 38000 ppm total solids, out of which 6800 ppm corresponded to divalent ions (Calcium and Magnesium), a 1% by weight concentration of supramolecular complexes 9 and ethane ($CH_3CH_3$) as gas.

The foam stability results obtained on the foaming test at atmospheric pressure and at a 1% by weight concentration of supramolecular complex 15 are shown in FIG. 17 (Stability performance over time, at 1 kg/cm$^2$ and 75° C., of the foam prepared with brine at 1% by weight of supramolecular complexes 9), and the analysis of the results indicates that the 30% minimum stability is reached in 77 minutes.

EXAMPLE 15

In order to establish the effect of adding cationic surfactants on the stability of foam generated with ethane gas and sodium dodec-2-en-1-sulfonate 10 and coco-amido-propyl betaine 11 interaction-derived supramolecular complexes 9, formulation E, consisting of 91% by weight of supramolecular complexes 9, 4.5% by weight of a cationic surfactant of the dodecil-trimethyl-ammonium chloride 18 type and 4.5% by weight of coco-amido-propyl betaine 11, was evaluated. The stability of formulation E was assessed by means of the foaming test at atmospheric pressure, at a temperature of 75° C., using a brine containing 38000 ppm total solids, with 6800 ppm corresponding to divalent ions (Calcium and Magnesium), a 1% by weight concentration of formulation E and ethane ($CH_3CH_3$) as gas.

The foam stability results obtained on the foaming test at atmospheric pressure and at a 1% by weight concentration of formulation E are shown in FIG. 18 (Stability performance over time, at 1 kg/cm$^2$ and 75° C., of the foam prepared with brine at 1% by weight of formulation E), and the analysis of the results indicates that the 30% minimum stability is reached in 107 minutes.

EXAMPLE 16

In order to establish the effect of adding cationic surfactants and itaconic acid-derived oligomers on the stability of foam generated with ethane gas and supramolecular complexes 9 derived from the interaction of sodium dodec-2-en-1-sulfonate 10 and coco-amido-propyl betaine 11, formulation F, consisting of 87% by weight of supramolecular complex 9, 4.4% by weight of dodecil-trimethyl-ammonium chloride 18, 4.3% by weight of coco-amido-propyl betaine 11 and 4.3% by weight of Poly(itaconic acid) 16 with an average molecular weight of 1100 Dalton, was evaluated. The stability of formulation F was assessed by means of the foaming test at atmospheric pressure, at a temperature of 75° C., using a brine containing 38000 ppm total solids, out of which 6800 ppm corresponded to divalent ions (Calcium and Magnesium), a 1% by weight concentration of formulation F and ethane ($CH_3CH_3$) as gas.

The foam stability results obtained on the foaming test at atmospheric pressure and at a 1% by weight concentration of formulation C are shown in FIG. 19 (Stability performance over time, at 1 kg/cm$^2$ and 75° C., of the foam prepared with brine at 1% by weight of formulation F), and the analysis of the results indicates that the 30% minimum stability is reached in 138 minutes.

FIG. 20 (Stability over time, at 1 kg/cm$^2$ and 75° C., of foams generated by different chemical products (supramolecular complexes 9, formulation E and formulation F) at 1% by weight) shows a comparison of the stability results obtained with foam generated by sodium dodec-2-en-1-sulfonate 10 and coco-amido-propyl betaine 11 interaction-derived supramolecular complexes 9, formulation E and formulation F, indicating that the foam generated by formulation F is 1.3-fold more stable than the one generated by formulation E and 1.8-fold more stable than the one generated by supramolecular complexes 9, with these results demonstrating in a novel fashion the advantage of using cationic surfactants of the alkyl ammonium quaternary salts type and/or itaconic acid-derived oligomers together with supramolecular complexes 9 as foaming agents at atmospheric pressure, elevated temperature, high concentrations of total solids, divalent ions, and ethane as gas to generate the foam.

EXAMPLE 17

In order to establish the effect of a higher concentration of divalent ions in the brine employed, supramolecular complexes 9 were evaluated in a brine containing 38000 ppm total solids, out of which 6800 ppm corresponded to divalent ions (Calcium and Magnesium), at a 1% by weight concentration of supramolecular complexes 9 and using nitrogen ($N_4$) as gas.

The foam stability results obtained on the foaming test at atmospheric pressure and at a 1% by weight concentration of supramolecular complexes 9 are shown in FIG. 21 (Stability performance over time, at 1 kg/cm$^2$ and 75° C., of the foam prepared with brine at 1% by weight of supramolecular complexes 9), and the analysis of the results indicates that the 30% minimum stability is reached in 25 minutes.

EXAMPLE 18

In order to establish the effect of adding cationic surfactants on the stability of foam generated with sodium dodec-2-en-1-sulfonate 10 and coco-amido-propyl betaine 11 interaction-derived supramolecular complexes 9, a formulation G was prepared, consisting of 50% by weight of supramolecular complexes 9, 28% by weight of coco-amido-propyl betaine 11 and 22% by weight of a cationic surfactant of the dodecil-trimethyl-ammonium chloride 18 type. The stability of formulation G was evaluated by means of the foaming test at atmospheric pressure, at a temperature of 75° C., using a brine containing 38000 ppm total solids, out of which 6800 ppm corresponded to divalent ions (Calcium and Magnesium), a 1% by weight concentration of formulation G and nitrogen ($N_2$) as gas.

The foam stability results obtained on the foaming test at atmospheric pressure and at a 1% by weight concentration of formulation G are shown in FIG. 22 (Stability performance over time, at 1 kg/cm$^2$ and 75° C., of the foam prepared with brine at 1% by weight of formulation G), and the analysis of the results indicates that the 30% minimum stability is reached in 145 minutes.

FIG. 23 (Stability over time, at 1 kg/cm$^2$ and 75° C., of foams generated by different chemical products (supramolecular complexes 9 and formulation G) at 1% by weight) shows a comparison of the stability results obtained with foam generated by sodium dodec-2-en-1-sulfonate 10 and coco-amido-propyl betaine 11 interaction-derived supramolecular complexes 9 and formulation G, indicating that the foam generated by formulation G is 5.8-fold more stable than the one generated by supramolecular complexes 9, with these results demonstrating in a novel fashion the advantage of using cationic surfactants of the alkyl ammonium quaternary salts type together with supramolecular complexes 9 as foaming agents at atmospheric pressure, high temperature, high concentrations of total solids, divalent ions and nitrogen as gas to generate the foam.

II) Foam Generation Test at High Pressure

The high-pressure foam generation system comprises a PVT cell (Pressure, temperature, volume) adapted as shown in FIG. 24 (Adapted PVT used for foam stability testing at high pressure and temperature).

The adapted PVT cell consists of a BPR valve, the purpose of which is maintaining the working pressure in the system and enabling the injection of the fluids. Within the cell and at the bottom, a disperser was adapted, through which the gas is injected; at this same part, an inlet was adapted for the injection of the brine, which has already been formulated with the foaming agent. The foam is generated within a sapphire tube, which contains a plunger that moves in order to allow for the fluids to enter; the space between the plunger and the BPR is filled with mineral oil, which enables to control the plunger's height.

In order to carry out the measurement of the stability of the foam and its foaming capability, a process was developed, comprising the following 11 steps: 1) Preparing the PVT cell (FIG. 24) with the corresponding adaptations for the foams test, 2) Opening the cell valves and turning on the vacuum pump for 30 minutes, 3) Injecting the gas into the cell until the pressure within the cell reaches the pressure corresponding to the pressure of the test and the height of the plunger reaches −0.327, 4) Injecting the foaming agent volume (50 cc), 4) Recording the height of the foaming agent with respect to its reference and recording the height of the plunger with the foaming agent loaded, 5) Setting the gas cylinder at a 150 kg/cm$^2$ pressure, 6) Recording the difference in height between liquid and foam (if there is any), 6) Recording the starting time of the test, 7) Injecting the gas into the system through the diffuser for 5 seconds, counting with the stopwatch, 8) Cutting off the injection of gas and waiting for the gas cylinder pressure to reach 150 kg/cm$^2$, recording the volume of injected gas, 9) Recording the foam's initial height and starting measuring the foam and the liquid height every ten minutes, until the foam completely flattens and the foaming agent reaches the initial heights of the test, 10) Determining the foam's stability % at every time.

EXAMPLE 19

Stability determination of the foam generated by sodium dodec-2-en-1-sulfonate 10 and coco-amido-propyl betaine 11 interaction-derived supramolecular complexes 9.

The stability of the foam generated by sodium dodec-2-en-1-sulfonate 10 and coco-amido-propyl betaine 11 interaction-derived supramolecular complexes 9 was evaluated by means of the foaming test at high pressure, at a temperature of 95° C., a pressure of 100 kg/cm$^2$, using a brine containing 120000 ppm total solids, out of which 5323 ppm corresponded to divalent ions (Calcium and Magnesium), a 1% by weight concentration of supramolecular complexes 9 and nitrogen ($N_2$) as gas.

The time established for the attainment of each parameter (foam and liquid height) was ten minutes and the foam stability minimum percentage recorded was 45%.

FIG. 25 (Stability performance over time, at 100 kg/cm$^2$ and 95° C., of the foam formed with brine at 1% by weight of supramolecular complexes 9) shows the stability to time ratio of the foam obtained with supramolecular complex 9 and the 45% minimum stability is reached in 72 hours (4320 minutes).

A comparison between the time required on the foaming test at atmospheric pressure (example 4) and the foaming test at high pressure (example 19) for the stability of the foam generated by supramolecular complexes 9 to increase to a 45%, indicates that the pressure increase has a positive effect on the foam stability, and that the time required to diminish the stability % of the foam on the test under high pressure conditions is 681-fold higher than the time required on the test at atmospheric pressure.

In order to demonstrate that supramolecular complexes 9 offer great advantages when used as foaming agents at high pressure over the components used as raw materials for its formation, the stability of the foam generated by sodium dodec-2-en-1-sulfonate 10 and coco-amido-propyl betaine 11 was determined under the same experimental conditions referred in example 19.

EXAMPLE 20

Stability determination of the foam generated by sodium dodec-2-en-1-sulfonate 10 at high pressure.

The foam stability results obtained on the foaming test at high pressure and at a 1% by weight concentration of sodium dodec-2-en-1-sulfonate 10 are shown in FIG. 26 (Stability performance over to time, at 100 kg/cm$^2$ and 95° C., of the foam generated with brine at 1% by weight of dodec-2-en-1-sodium sulfonate 10) and the analysis of the results indicates that the 62% minimum stability is reached in of 3.5 hours (210 minutes). After this time point the foam breaks.

EXAMPLE 21

Stability determination of the foam generated by coco-amido-propyl betaine 11 at high pressure.

The foam stability results obtained on the foaming test at high pressure and at a 1% by weight concentration of coco-amido-propyl betaine 11 are shown in FIG. 27 (Stability performance over time, at 100 kg/cm$^2$ and 95° C., of the foam formed with brine at 1% by weight of coco-amido-propyl betaine 11) and the analysis of the results indicates that the 50% minimum stability is reached in 2.1 hours (126 minutes). After this time point the foam breaks.

A comparison of the stability results obtained with foam generated by sodium dodec-2-en-1-sulfonate 10 and coco-amido-propyl betaine 11 interaction-derived supramolecular complexes 9, sodium dodec-2-en-1-sulfonate 10 and coco-amido-propyl betaine 11 on the high-pressure test (FIG. 28. Stability over time, at 100 kg/cm$^2$ and 95° C., of the foams generated by different chemical products (supramolecular complexes 9, sodium dodec-2-en-1-sulfonate 10 and coco-amido-propyl betaine 11) at 1% by weight) indicates that the foam generated by supramolecular complexes 9 is 6.5-fold more stable than the one generated by sodium dodec-2-en-1-sulfonate 10 and 18-fold more stable than that generated by coco-amido-propyl betaine 11, with these results demonstrating in a novel fashion the advantage of using sodium dodec-2-en-1 sulfonate 10 and coco-amido-propyl betaine 11 interaction-derived supramolecular complexes 9 as foaming agents at high pressure, elevated temperature and high total solid and divalent ions concentration.

III) Gas Piping Control Test

The experimental array developed to assess the capacity of the foam that will control the piping of gas in fractured systems is shown in FIG. 29 (Experimental array used for the control of gas piping).

The experimental procedure to assess the capacity of the foam that will control the piping of gas in fractured systems comprises the following 4 steps:

1. Preparation of the Artificial Fracture System.

An artificial fractures system is built, consisting of 4 low-permeability stoppers longitudinally cut in the middle, serially attached in order to form a composite medium with an artificial fracture (FIG. 30. Artificial longitudinal fracture used for the gas piping control test). This system is placed on the core-holder and installed in the experimental array shown in FIG. 31. Once installed, its permeability (40 mD) and its porosity (3.67%) are experimentally determined. An overcharge pressure is applied (300 psi higher than the displacement pressure) using the BC3 pump. Then, the system is saturated with the formation's synthetic brine and it is brought to irreducible water conditions with oil. The system is left to age for two weeks under reservoir pressure and temperature conditions.

2. Foam Formation.

At this step, three cylinders are used: one containing nitrogen (B1), another containing brine (B2) dosed as the foaming agent, and the cylinder receiving the formed foam (B3).

The gas (BC1 pump) and brine (BC2 pump) injection is carried out simultaneously; the outputs used for each one of these fluids' injection depend on the desired amount of foam. The liquids are mixed in a system formed by two concentric tubes and the mixed liquids are passed through a high porosity and permeability packed column (PC) in order to ensure the mixing. At the end of the packed column, a capillary glass tube is attached to visually ensure that the foam is formed. The foam generated is collected in the third cylinder (B3); if required, the foam generated can be returned to the gas cylinder.

3. Foam Injection.

The foam is injected into the fractured medium using the BC1 pump, attaching a capillary glass tube (TC1) before the fractured system in order to visually check the foam generated. At the end of the fractured system there is also a visual cell (TC2) to identify the foam's stability once it has passed through the fracture system. Before and after the fractured system there are two pressure transductors.

4. Gas Advance Control.

In order to test the blocking capacity of the fracture with the foam, gas is injected counter flow-wise using the BC2 pump, maintaining a 10 psi pressure differential (the pressure at the other end is the reservoir pressure), leaving the system stand for two weeks (FIG. 29).

EXAMPLE 22

Stability determination of the foam generated by sodium dodec-2-en-1-sulfonate 10 and coco-amido-propyl betaine 11 interaction-derived supramolecular complexes 9.

The capacity of the foam generated by sodium dodec-2-en-1-sulfonate 10 and coco-amido-propyl betaine 11 interaction-derived supramolecular complexes 9 to control the piping of gas in fractured systems at high pressure and temperature was evaluated using the gas piping control test, at a temperature of 95° C., a pressure of 100 kg/cm², using a brine containing 120000 ppm total solids, with 5323 ppm of them corresponding to divalent ions (Calcium and Magnesium), a 1% by weight concentration of supramolecular complexes 9 and nitrogen (N2) as gas. The counter flow gas pressure was such, that it allowed reaching a 10 psi pressure difference and the system was left to stay for two weeks.

The pressure differential remained stable throughout the two weeks, thus demonstrating that the foam is efficiently controlling the gas piping problems in fractured systems under high temperature, pressure and salinity conditions.

What is claimed is:

1. A foaming composition with foaming properties containing as active component, in a % by weight ranging from 0.5 to 99.5% supramolecular complexes comprising a mixture of sodium alpha olefin sulfonates and alkyl amido propyl betaines in a ratio by weight from 1:1 to 1:2, and having the structural formula:

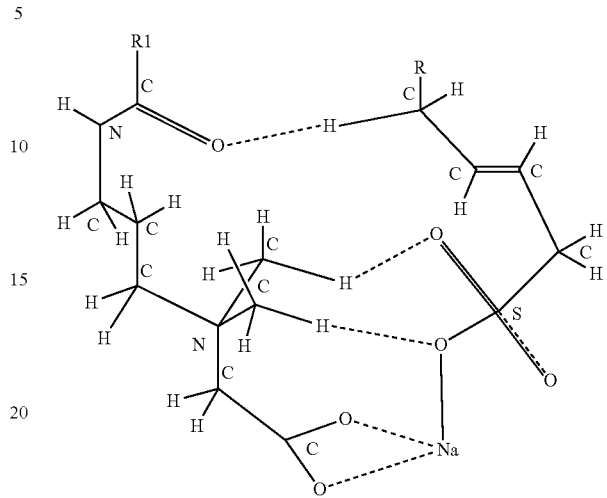

and at least one compound selected from the group consisting of a sodium hydroxy alkyl sulfonate, an alkyl ammonium quaternary salt, a divalent ion sequestrant, and a gel;

wherein R and R1 are linear or branched independent alkyl chains and with a length thereof ranging from 1 to 30 carbon atoms.

2. A composition with foaming properties according to claim 1, wherein said sodium alpha olefin sulfonates compounds are selected from the group consisting of sodium but-2-en-1-sulfonate, sodium pent-2-en-1-sulfonate, sodium hex-2-en-1-sulfonate, sodium hept-2-en-1-sulfonate, sodium oct-2-en-1-sulfonate, sodium non-2-en-1-sulfonate, sodium dec-2-en-1-sulfonate, sodium undec-2-en-1-sulfonate, sodium dodec-2-en-1-sulfonate, sodium tetradec-2-en-1-sulfonate, sodium hexadec-2-en-1-sulfonate and the mixture of one or more of said sodium alpha olefin sulfonates.

3. A composition with foaming properties according to claim 1, wherein said alkyl amido propyl betaines-based compounds are selected from the group consisting of ethyl-amido-propyl-betaine, propyl-amido-propyl-betaine, butyl-amido-propyl-betaine, pentyl-amido-propyl-betaine, hexyl-amido-propyl-betaine, heptyl-amido-propyl-betaine, octyl-amido-propyl-betaine, nonyl-amido-propyl-betaine, decyl-amido-propyl-betaine, undecyl-amido-propyl-betaine, coco-amido-propyl-betaine, and mixtures of one or more of said alkyl amido propyl betaines.

4. A composition with foaming properties according to claim 1, wherein said composition comprises aqueous solvents, alcohols or a mixture of aqueous solvents and alcohols.

5. A composition with foaming properties according to claim 1, further comprising an aqueous solvent or alcohol or mixture of aqueous solvents and alcohols % by weight ranges from 0.5 to 99.5%.

6. A composition according to claim 1, comprising said active component in an amount of 10 to 90% by weight.

7. A foam composition, wherein said foam composition is obtained by mixing the composition of claim 1 with a gas selected from the group consisting of nitrogen, oxygen, carbon dioxide, natural gas, methane, propane, butane, and mixtures of two or more of said gases.

8. A composition according to claim 1, wherein said at least one compound is a sodium 3-hydroxy-alkyl-sulfonate anionic surfactant.

9. A composition according to claim 1, wherein said at least one component is an alkyl ammonium quaternary salt cationic surfactant.

10. A composition according to claim 9, wherein the cationic surfactant is an alkyl trimethyl ammonium bromide or chloride.

11. A composition according to claim 9, wherein the sodium alpha olefin sulfonates, alkyl amido propyl betaines and alkyl ammonium quaternary salts are present in a weight ratio of 1:2:1 to 1:1.01:0.01.

12. A composition according to claim 1, wherein said at least one compound is a divalent ion sequestrant.

13. A composition according to claim 12, wherein said divalent ion sequestrant is an itaconic acid-derived oligomers or copolymers having an average molecular weight ranging from 200 to 20000 Dalton.

14. A composition according to claim 12, wherein the sodium alpha olefin sulfonates, alkyl amido propyl betaines and divalent ion sequestrant are present in a weight ratio of 1:1:0.5 to 1:1:0.01.

15. A composition according to claim 1, wherein said at least one compound comprises an alkyl ammonium quaternary salt and divalent ion sequestrant.

16. A composition according to claim 1, further comprising a cationic surfactant and a divalent ion sequestrant, and wherein the sodium alpha olefin sulfonates, alkyl amido propyl betaines, cationic surfactant and divalent ion sequestrant are present in a weight ratio of 1:2:1:0.5 to 1:1.01:0.01.

17. A composition according to claim 1, wherein said at least one compound comprises a gel.

18. A composition according to claim 17, wherein said gel is a polymer or copolymer selected from the group consisting of polyacrylamides, partially hydrolyzed polyacrylamide, xanthan gum, poly(itaconic acid), poly(acrylic acid), poly(itaconic acid-co-acrylic acid), poly(itaconates) and poly(acrylates).

19. A composition according to claim 17, wherein said gel is selected from the group consisting of partially hydrolyzed polyacrylamide and xanthan gum.

20. A composition according to claim 17, wherein the sodium alpha olefin sulfonates, alkyl amido propyl betaines and gel are present in a weight ratio of 1:1:0.2 to 1:1:0.01.

21. A composition according to claim 1, further comprising anionic surfactants.

22. A process for enhancing recovery and production from a gas or oil well, said process comprising the steps of:
1) Preparing a foam from brine, a gas and a foaming composition containing as active component, in a % by weight ranging from 0.5 to 99.5% supramolecular complexes comprising a mixture of sodium alpha olefin sulfonates and alkyl amido propyl betaines in a relation by weight from 1:1 to 1:2, according to the following structural formula:

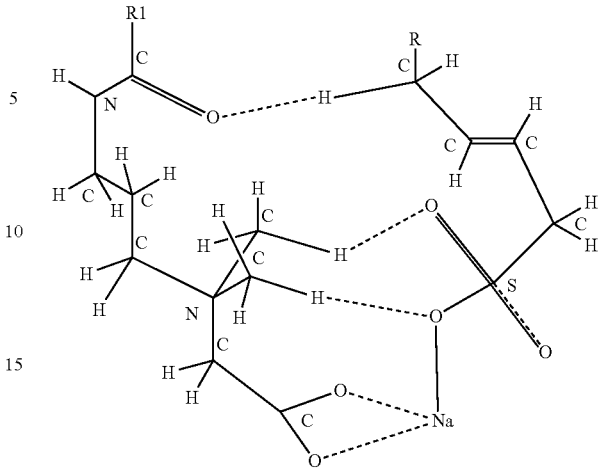

wherein R and R1 are independently a linear or branched alkyl having 1-30 carbon atoms, 2) Injecting the foam into the well;
3) Pumping foam from the well into a fractured reservoir;
4) Controlling gas advance within the fractured reservoir through the injected foam.

23. The process of claim 22, wherein said foam further comprises an alkyl quaternary ammonium salt cationic surfactant.

24. The process of claim 22, wherein said foam further comprises a sodium 3-hydroxy-alkyl-sulfonate anionic surfactant.

25. The process of claim 22, wherein said foam further comprises an alkyl quaternary ammonium salt cationic surfactant and divalent ions sequestrants.

26. The process of claim 22, wherein said foam further comprises an alkyl quaternary ammonium salt cationic surfactant, a divalent ion sequestrant and a gel.

27. The process of claim 22, wherein said well is formed in a naturally fractured carbonate.

28. The process of claim 22, wherein said foam is injected into a production well.

29. The process of claim 22, wherein said foam is continuously supplied to an injector well.

30. The process of claim 22, wherein the foam further comprises a sodium hydroxy alkyl sulfonate, an alkyl ammonium quaternary salt and a divalent ion sequestrant.

31. The process of claim 22, wherein the foam further comprises a sodium hydroxy alkyl sulfonate, an alkyl ammonium quaternary salt and a gel.

32. A composition with foaming properties containing as active component, in a % by weight ranging from 0.5 to 99.5%:
(a) a supramolecular complex comprising a mixture of sodium alpha olefin sulfonates and alkyl amido propyl betaines in a relation by weight from 1:1 to 1:2, according to the following structural formula:

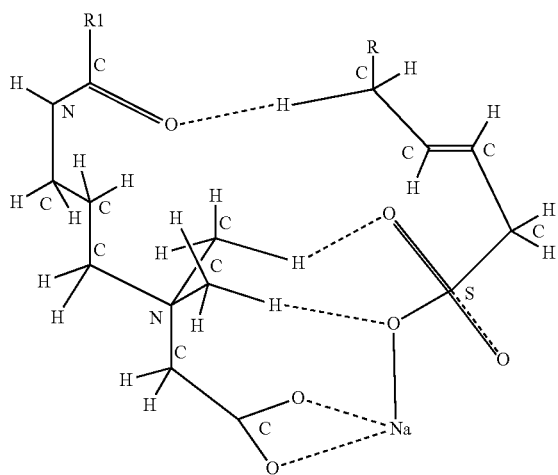

Wherein R and R1 are linear or branched independent alkyl chains and with a length thereof ranging from 1 to 30 carbon atoms, and (b) a sodium hydroxyl alkyl sulfonate,
(c) an alkyl ammonium quaternary salt, and
(d) a divalent ion sequestrant.

33. A composition with foaming properties containing as active component, in a % by weight ranging from 0.5 to 99.5%:
 (a) a supramolecular complex comprising a mixture of sodium alpha olefin sulfonates and alkyl amido propyl betaines in a relation by weight from 1:1 to 1:2, according to the following structural formula:

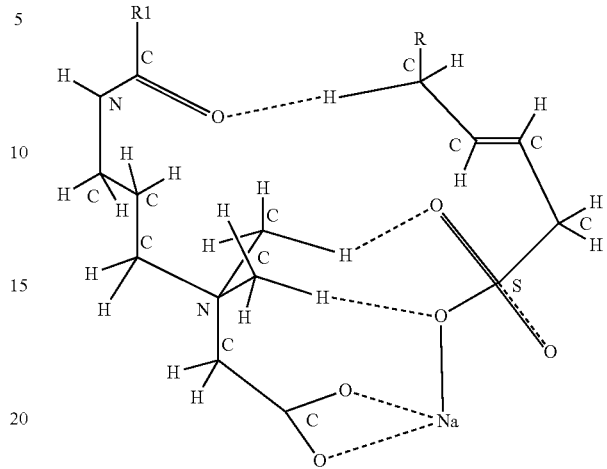

Wherein R and R1 are linear or branched independent alkyl chains and with a length thereof ranging from 1 to 30 carbon atoms, and (b) a sodium hydroxyl alkyl sulfonate,
(c) an alkyl ammonium quaternary salt, and
(d) a gel.

* * * * *